US010210600B2

(12) United States Patent
Baek

(10) Patent No.: US 10,210,600 B2
(45) Date of Patent: Feb. 19, 2019

(54) METHOD OF REMOVING NOISE FROM IMAGE DATA

(71) Applicant: SAMSUNG ELECTRONICS CO., LTD., Suwon-si, Gyeonggi-do (KR)

(72) Inventor: Byung-Joon Baek, Goyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 30 days.

(21) Appl. No.: 15/435,374

(22) Filed: Feb. 17, 2017

(65) Prior Publication Data

US 2017/0270643 A1 Sep. 21, 2017

(30) Foreign Application Priority Data

Mar. 15, 2016 (KR) .................. 10-2016-0030966

(51) Int. Cl.
| | |
|---|---|
| *G06K 9/00* | (2006.01) |
| *G06K 9/40* | (2006.01) |
| *H04N 5/00* | (2011.01) |
| *G06T 5/00* | (2006.01) |
| *H04N 9/04* | (2006.01) |
| *G06T 5/20* | (2006.01) |

(52) U.S. Cl.
CPC ............. *G06T 5/002* (2013.01); *G06T 5/20* (2013.01); *H04N 9/045* (2013.01); *G06T 2207/10024* (2013.01)

(58) Field of Classification Search
USPC ................... 382/167, 260, 275; 348/607
See application file for complete search history.

(56) References Cited

U.S. PATENT DOCUMENTS

| | | | |
|---|---|---|---|
| 6,737,625 B2 | 5/2004 | Baharav et al. | |
| 7,034,873 B2 | 4/2006 | Mendis et al. | |
| 7,283,164 B2 | 10/2007 | Kakarala et al. | |
| 7,734,115 B2 | 6/2010 | Kang et al. | |
| 8,208,044 B2 | 6/2012 | Atanassov et al. | |
| 8,213,738 B2* | 7/2012 | Kwon .................... | H04N 5/357 348/607 |
| 8,417,047 B2 | 4/2013 | Chatterjee et al. | |
| 8,594,456 B2* | 11/2013 | Yang ...................... | G06T 5/002 382/260 |
| 8,704,901 B2 | 4/2014 | Numata et al. | |

(Continued)

*Primary Examiner* — Kathleen Y Dulaney
(74) *Attorney, Agent, or Firm* — Volentine, Whitt & Francos, PLLC

(57) ABSTRACT

A method of removing noise from image data output from an image sensor includes comparing a target block in the image data with each of at least one comparison blocks around the target block in the image data. A center pixel similarity between center pixels of the target block and each comparison block is calculated. A neighboring pixel similarity between neighboring pixels neighboring the center pixels in the target block and each comparison block is calculated. The method includes determining whether an impulsive noise exists in the center pixel of the target block based on the center pixel similarity and the neighboring pixel similarity. A weight applied to a value of the center pixel of each comparison block is adjusted based on a result of the determining. Weighted averaging is performed on values of the center pixels of the comparison blocks to estimate a value of the center pixel of the target block.

18 Claims, 20 Drawing Sheets

(56) References Cited

U.S. PATENT DOCUMENTS

| | | | |
|---|---|---|---|
| 8,818,126 B2* | 8/2014 | Shin | G06T 5/002 |
| | | | 382/232 |
| 8,913,842 B2 | 12/2014 | Fujita et al. | |
| 9,105,082 B2* | 8/2015 | Kim | G06T 5/002 |
| 9,123,103 B2 | 9/2015 | Chen et al. | |
| 9,679,363 B1* | 6/2017 | Li | G06T 5/002 |
| 2009/0052775 A1* | 2/2009 | Moon | H04N 5/217 |
| | | | 382/167 |
| 2010/0091194 A1* | 4/2010 | Lei | G06T 5/50 |
| | | | 348/607 |
| 2010/0141810 A1 | 6/2010 | Wang et al. | |
| 2011/0069904 A1* | 3/2011 | Yang | G06T 5/002 |
| | | | 382/275 |
| 2012/0200754 A1* | 8/2012 | Fainstain | G06T 5/002 |
| | | | 348/302 |
| 2015/0093041 A1* | 4/2015 | Kang | G06T 5/002 |
| | | | 382/275 |
| 2015/0279006 A1* | 10/2015 | Choi | G06T 5/002 |
| | | | 382/264 |

\* cited by examiner

METHOD OF REMOVING NOISE FROM IMAGE DATA

CROSS-REFERENCE TO RELATED APPLICATIONS

This application claims priority under 35 U.S.C. § 119(a) to Korean Patent Application No. 10-2016-0030966, filed on Mar. 15, 2016, in the Korean Intellectual Property Office, the disclosure of which is hereby incorporated by reference in its entirety.

BACKGROUND

Field of the Disclosure

The present disclosure relates to a method of removing noise from image data. More particularly, the present disclosure relates to a method of efficiently removing various types of noise from image data output from an image sensor.

Background Information

An image sensor is a device which converts a captured image into electrical signals using a photoelectric element, converts the electrical signals into digital signals, and outputs the digital signals in a form of image data. Image data output from an image sensor may include noises having various characteristics due to the structure of the image sensor and transmission lines that carry the digital signals. These noises are usually removed individually according to their characteristics. However, individually removing noises from an image increases the complexity of computation, which leads to, for example, an increase of power consumption.

To overcome these problems, a method of efficiently removing noise having various characteristics from image data output from an image sensor is desired.

SUMMARY

According to some embodiments of the present disclosure, a method of removing noise from image data includes comparing a target block with each of one or more comparison blocks around the target block in the image data and calculating a center pixel similarity and a neighboring pixel similarity between the target block and each comparison block. The method also includes determining whether an impulsive noise exists in a center pixel of the target block based on the center pixel similarity and the neighboring pixel similarity. The method further includes adjusting a weight applied to a value of a center pixel of each of the comparison blocks based on a determination result. The method moreover includes performing weighted averaging on values of center pixels of the comparison blocks to estimate a value of the center pixel of the target block.

According to other embodiments of the present disclosure, a method of operating an image processing system for removing noise includes receiving a pattern descriptor. The method also includes comparing a target block with each of one or more comparison blocks around the target block in the image data using the pattern descriptor and calculating a center pixel similarity and a neighboring pixel similarity between the target block and each comparison block. The method further includes adjusting a weight applied to a value of a center pixel of each of the comparison blocks using only the neighboring pixel similarity among the center pixel similarity and the neighboring pixel similarity based on a determination that an impulsive noise exists in a center pixel of the target block based on the center pixel similarity and the neighboring pixel similarity. The method moreover includes performing weighted averaging on values of center pixels of the comparison blocks to estimate a value of the center pixel of the target block.

BRIEF DESCRIPTION OF THE DRAWINGS

The above and other features and advantages of the concepts described herein will become more apparent by describing in detail exemplary embodiments thereof with reference to the attached drawings in which.

DETAILED DESCRIPTION OF THE EMBODIMENTS

Figure 1:
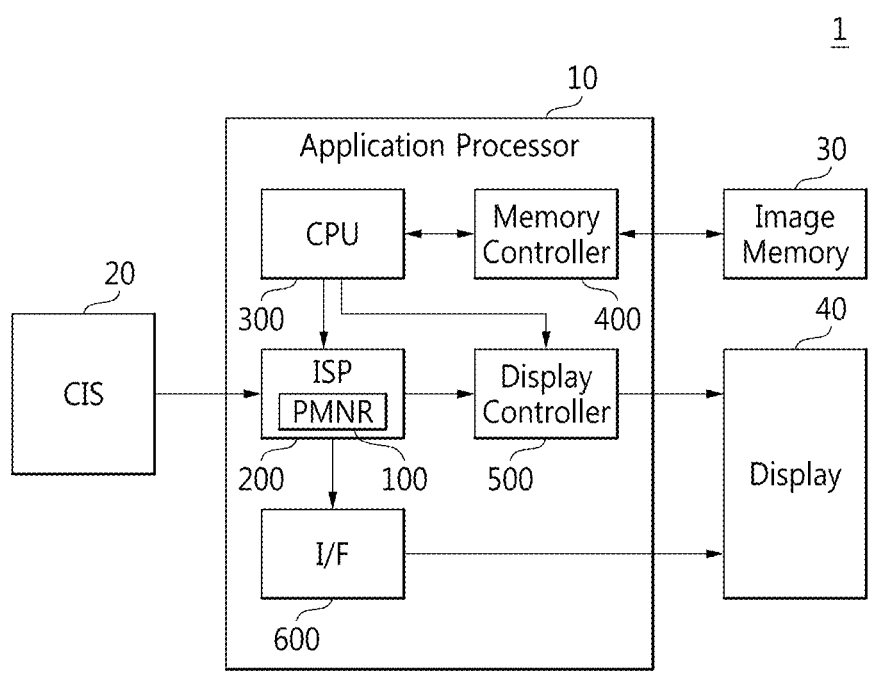
FIG. 1 is a schematic block diagram of an image processing system according to some embodiments of the present disclosure.

FIG. 1 is a schematic block diagram of an image processing system 1 according to some embodiments of the present disclosure. The image processing system 1 may include an application processor (AP) 10, a CMOS image sensor (CIS) 20, an image memory 30, and a display 40.

The CMOS image sensor 20 may convert the intensity of incident light input by photographing an object into electrical data using a photoelectric element, convert the electrical data into image data, and output the image data frame by frame. The CMOS image sensor 20 may include a color filter array for the conversion into the electrical data. The color filter array may include a bayer pattern with a wide dynamic range. The color filter array may include at least one filter among an RGB color filter, an RGBW color filter, an RGBE color filter, a CYYM color filter, a CYGM color filter, and an RWB color filter, and may also include a BW color filter. The image data may have a form of a stream of sequential digital values corresponding to respective pixels. The image data may be referred to as bayer pattern data.

The application processor 10 may include an image signal processor (ISP) 200, a central processing unit (CPU) 300, a memory controller 400, a display controller 500, and an interface (I/F) 600. The image signal processor 200 may process image data received from the CMOS image sensor 20 and may output processed image data to the display controller 500 or the I/F 600. The image data may be RGB image data, YUV image data, or YCbCr image data, but the image data is not restricted to these examples.

A noise removing device (labeled "PMNR") 100 that uses a pattern matching method may receive image data. The image data may be bayer pattern data received from the CMOS image sensor 20. In other embodiments, the image data may be image data received from the image signal processor 200. The noise removing device 100 may process image data block by block or pixel by pixel. Here, a block may be a sub-region existing in the image data. The noise removing device 100 may efficiently remove noises from image data. The noises may include a temporal noise which changes over time and a fixed pattern noise which has a fixed pattern.

Although the noise removing device 100 is implemented within the image signal processor 200 in the embodiments illustrated in FIG. 1, the noise removal is not restricted to the current embodiments. The noise removing device 100 may be implemented within the CMOS image sensor 20 or may be implemented as a bridge circuit between the CMOS image sensor 20 and the application processor 10 in other embodiments. The noise removing device 100 that uses a pattern matching method will be described in detail with reference to FIGS. 2 through 18 later.

The CPU 300 may control the overall operation of the application processor 10. The CPU 300 may control the memory controller 400 to process or execute a program and/or data stored in the image memory 30. The CPU 300 may also control the image signal processor 200 to transmit processed image data to the display 40 through the I/F 600. The CPU 300 may be implemented as a single computing component having at least two independent processors or cores, i.e., as a multi-core processor.

The memory controller 400 may control a data access operation, e.g., a write operation or a read operation, of the image memory 30 under the control of the CPU 300. The memory controller 400 may be implemented in a chip separated from the CPU 300 or as a part of the CPU 300.

The display controller 500 may generate a variety of control signals for controlling the display 40 and transmit the control signals to the display 40 under the control of the CPU 300. The display controller 500 may transmit image data processed by the image signal processor 200 to the display 40 under the control of the CPU 300. The display controller 500 may transmit the control signals and the image data to the display 40 using mobile industry processor interface (MIPI®) display serial interface (DSI) or embedded DisplayPort (eDP).

The display 40 may receive control signals and image data from the display controller 500 and may display the image data according to the control signals. The display 40 may be implemented as a thin film transistor-liquid crystal display (TFT-LCD), a light emitting diode (LED) display, an organic LED (OLED) display, an active-matrix OLED (AMOLED) display, a flexible display, or a transparent display.

The image processing system 1 may be implemented as a personal computer (PC) or a mobile computing device. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

Figure 2:
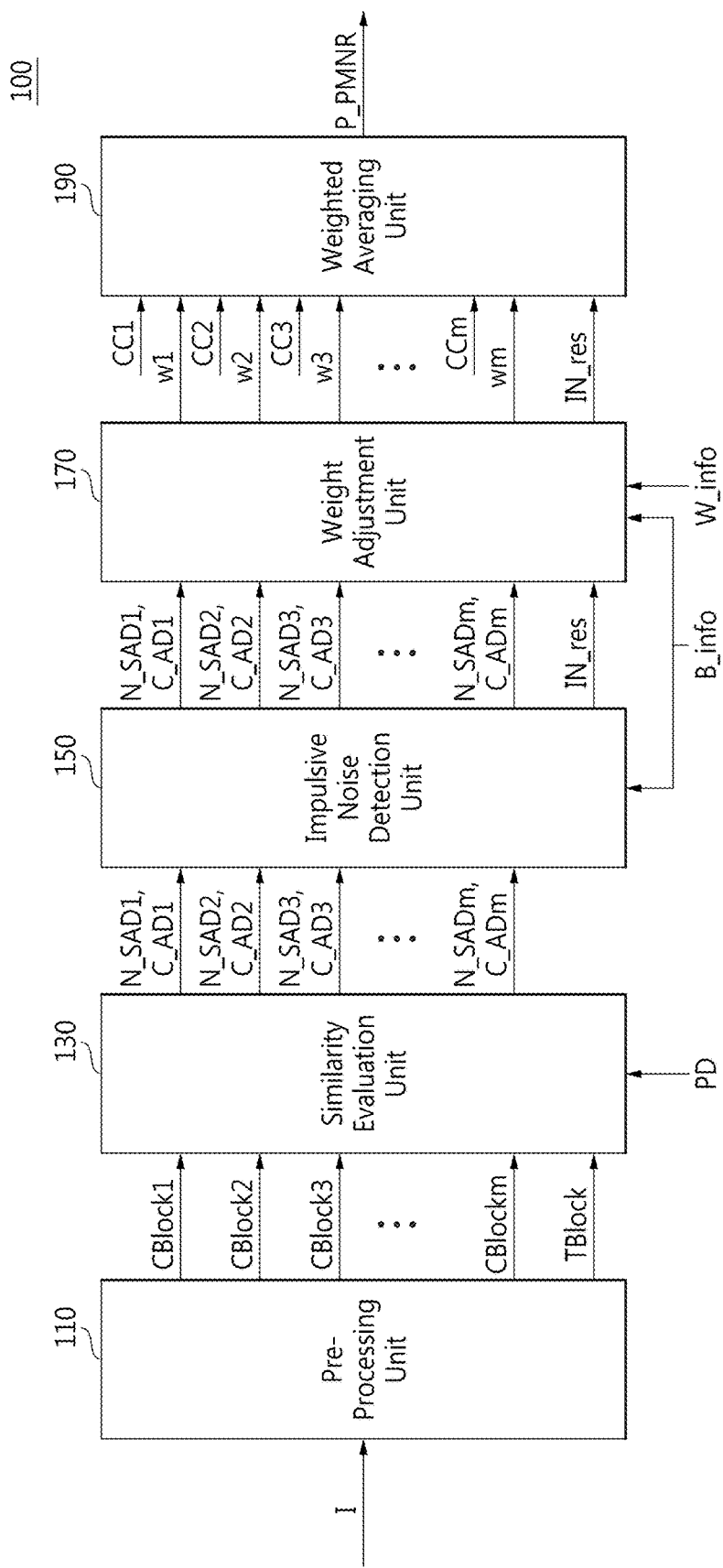
FIG. 2 is a block diagram of a noise removing device using a pattern matching method according to some embodiments of the present disclosure.

FIG. 2 is a block diagram of the noise removing device 100 that uses a pattern matching method according to some embodiments of the present disclosure. Referring to FIG. 2, the noise removing device 100 may include a pre-processing unit 110, a similarity evaluation unit 130, an impulsive noise detection unit 150, a weight adjustment unit 170, and a weighted averaging unit 190.

The pre-processing unit 110 may receive image data I from either the CMOS image sensor 20 or the image signal processor 200. The pre-processing unit 110 may perform geometrical correction and optical correction on the image data I. The pre-processing unit 110 may include a lens shading corrector (not shown), a chromatic aberration corrector (not shown), and a rectification engine (not shown) to perform the geometrical correction and the optical correction.

The lens shading corrector may receive shading information and may correct a difference in light intensity which gradually drops off from the center of the CMOS image sensor 20 toward the edge based on the shading information under the control of the CPU 300. The difference in light intensity may be caused by the curved shape of a lens included in the CMOS image sensor 20.

The chromatic aberration corrector may receive chromatic aberration information and correct chromatic aberration based on the chromatic aberration information under the control of the CPU 300. The chromatic aberration may be caused by a phenomenon in which longer wavelengths of light are focused at positions farther away from a lens included in an image sensor since different wavelengths of light incident on the lens have different refractive indices.

The rectification engine may receive rectification information and perform geometrical transformation on image data based on the rectification information under the control of the CPU 300. The geometrical transformation may include linear transformation such as rotation transformation, scaling transformation, or affine transformation.

The pre-processing unit 110 may output the image data I that has been subjected to the geometrical correction and the optical correction to the similarity evaluation unit 130. At this time, the pre-processing unit 110 may divide the image data I into a target block TBlock and comparison blocks CBlock1 through CBlockm (where "m" is an integer of at least 1). The target block TBlock and the comparison blocks CBlock1 through CBlockm will be described in detail with reference to FIG. 3.

Figure 3:
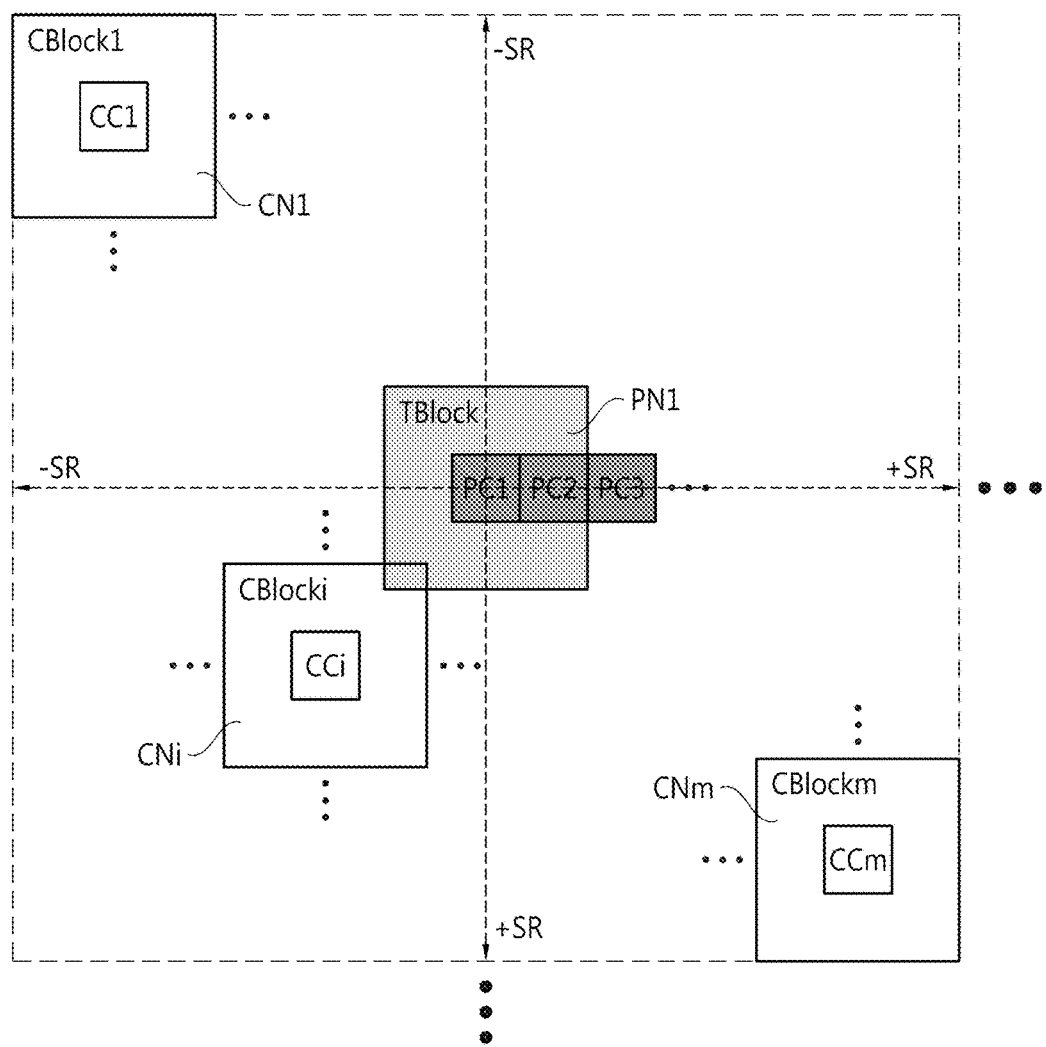
FIG. 3 is a diagram for explaining a target block and comparison blocks.

FIG. 3 is a diagram for explaining the target block TBlock and the comparison blocks CBlock1 through CBlockm. The target block TBlock may be one of multiple blocks existing in the image data I. Each of the blocks may be a block which has one of multiple pixels, e.g., PC1, PC2, and PC3 in the image data I as a center pixel and has a predetermined size. The comparison blocks CBlock1 through CBlockm may exist within a search range SR from the center pixel, e.g., PC1, of the target block TBlock and may have a predetermined size. The size of the target block TBlock may be the same as that of each of the comparison blocks CBlock1 through CBlockm. The comparison blocks CBlock1 through CBlockm may include a block CBlockj (where "j" is an integer of at least 1 and at most "m") which is the same (e.g., size, height, width, number of pixels) as the target block TBlock.

The similarity evaluation unit 130 may compare the target block TBlock with each of the comparison blocks CBlock1 through CBlockm and calculate pixel similarities C_ADi and N_SADi, where "i" is an integer of at least 1 and at most "m". The similarity evaluation unit 130 may output the pixel similarities C_ADi and N_SADi to the impulsive noise detection unit 150.

After calculating the pixel similarities C_ADi and N_SADi for the target block TBlock having one pixel, e.g., PC1, as the center, the similarity evaluation unit 130 may calculate the pixel similarities C_ADi and N_SADi for another target block TBlock having another pixel, e.g., PC2, as the center. The pixel PC1 may be one of multiple pixels existing in the image data I and the pixel PC2 may be a pixel other than the pixel PC1 among the multiple pixels existing in the image data I. A procedure for calculating the pixel similarities C_ADi and N_SADi for the target block TBlock having the pixel PC1 at the center may be the same as a procedure for calculating the pixel similarities C_ADi and N_SADi for the target block TBlock having the pixel PC2 at the center.

Here, only the procedure in which the similarity evaluation unit 130 calculates the pixel similarities C_ADi and N_SADi for the target block TBlock having the pixel PC1 at the center will be described for convenience' sake in the description. This way of description will also be applied to the description of the structures and functions of the impulsive noise detection unit 150, the weight adjustment unit 170, and the weighted averaging unit 190.

The similarity evaluation unit 130 may use a pattern descriptor PD received from the image memory 30 to calculate the pixel similarities C_ADi and N_SADi. The pattern descriptor PD may be information which has been predetermined and stored in the image memory 30 for calculation of the pixel similarities C_ADi and N_SADi. The similarity evaluation unit 130 will be described in detail with reference to FIGS. 3 through 6 later.

The pixel similarities C_ADi and N_SADi are received from the similarity evaluation unit 130. Block information B_info is received from the image memory 30. The impulsive noise detection unit 150 may determine whether an impulsive noise exists in the center pixel PC1 of the target block TBlock using the pixel similarities C_ADi and N_SADi and block information B_info. The impulsive noise detection unit 150 may output determination result information IN_res to the weight adjustment unit 170. The block information B_info may include information about the size of the image data I (i.e., the height and width of a frame of the image data I) and information about the number "m" of the comparison blocks CBlock1 through CBlockm for one target block TBlock and the number "n" of pixels in each of the comparison blocks CBlock1 through CBlockm, where "n" is an integer of at least 1. The impulsive noise detection unit 150 will be described in detail with reference to FIG. 7 later.

The pixel similarities C_ADi and N_SADi are received from the impulsive noise detection unit 150. The determination result information IN_res is received from the impulsive noise detection unit 150. The weight adjustment unit 170 may adjust a weight "wi" (where "i" is an integer of at least 1 and at most "m"), which is applied to a value of the center pixel of each of the comparison blocks CBlock1 through CBlockm. The weight adjustment unit 170 adjusts the weight wi using the pixel similarities C_ADi and N_SADi, the determination result information IN_res, the block information B_info, and weight information W_info. The weight adjustment unit 170 may output the weight "wi" that has been adjusted to the weighted averaging unit 190. The weight adjustment unit 170 will be described in detail with reference to FIGS. 8 and 9 later.

The weighted averaging unit 190 may calculate a weighted average P_PMNR of the values of respective center pixels CC1 through CCm of the respective comparison blocks CBlock1 through CBlockm using weights "wi" received from the weight adjustment unit 170. The weighted averaging unit 190 may output the weighted average P_PMNR. The weighted average P_PMNR may be an estimated value of the center pixel PC1 of the target block TBlock. The weighted average P_PMNR may be a value obtained after noises having different characteristics are removed from the center pixel PC1 of the target block TBlock. The noises may be an impulsive noise and a Gaussian noise. The weighted averaging unit 190 will be described in detail with reference to FIG. 10 later.

Figure 4:
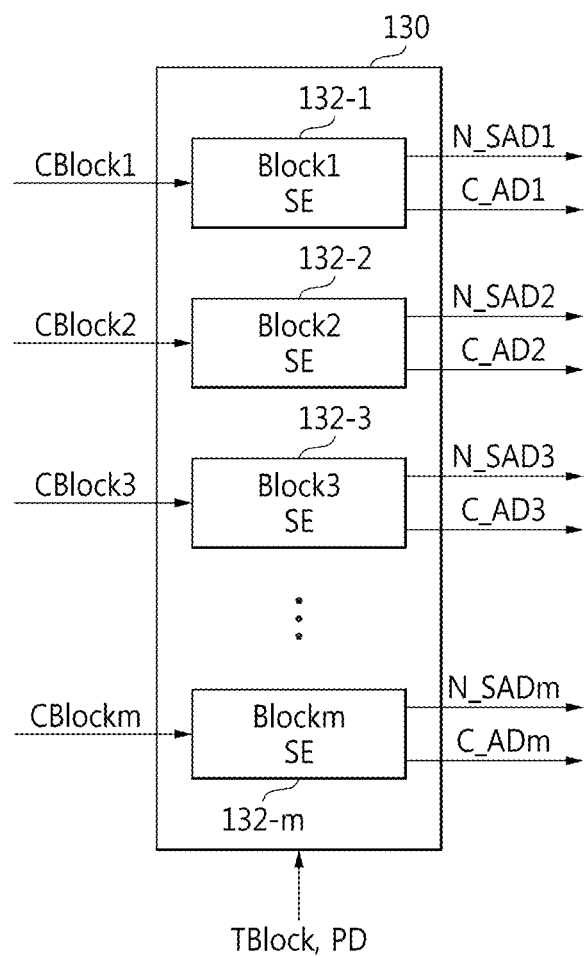
FIG. 4 is a detailed block diagram of a similarity evaluation unit illustrated in FIG. 2.
Figure 5:
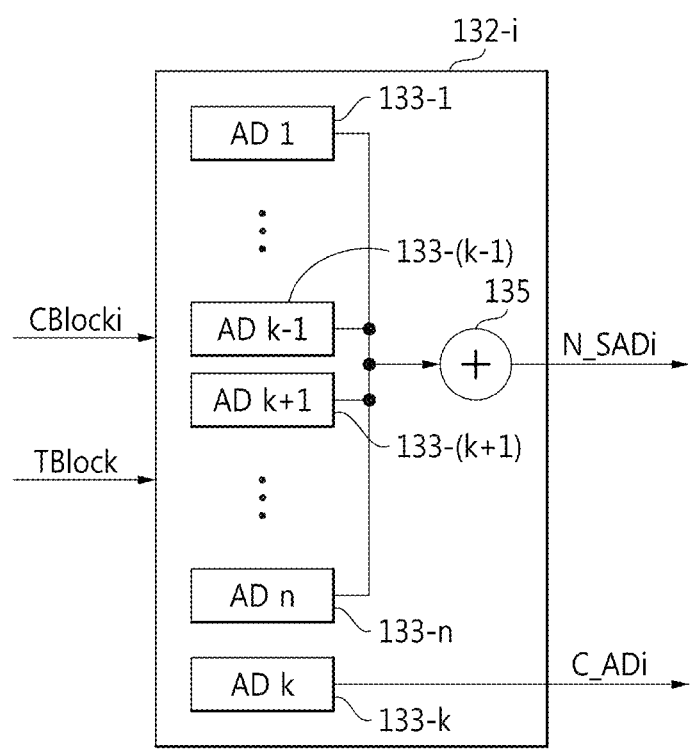
FIG. 5 is a detailed block diagram of one of the block similarity evaluators illustrated in FIG. 4.

FIG. 4 is a detailed block diagram of the similarity evaluation unit 130 illustrated in FIG. 2. FIG. 5 is a detailed block diagram of one of the block similarity evaluators illustrated in FIG. 4. Referring to FIGS. 4 and 5, the similarity evaluation unit 130 may include first through m-th block similarity evaluators 132-1 through 132-m, where "m" is an integer of at least 1). Each block similarity evaluator 132-i (where "i" is an integer of at least 1 and at most "m") may include first through n-th absolute value generators AD1 through ADn or 133-1 through 133-n (where "n" is an integer of at least 1) and an adder 135.

The block similarity evaluator 132-i may receive the target block TBlock and one comparison block CBlocki (where "i" is an integer of at least 1 and at most "m") among the comparison blocks CBlock1 through CBlockm from the pre-processing unit 110. The number of the similarity evaluators 132-1 through 132-m may be the same as the number of the comparison blocks CBlock1 through CBlockm.

The block similarity evaluator 132-i may calculate the pixel similarities C_ADi and N_SADi using the target block TBlock and the comparison block CBlocki and output the pixel similarities C_ADi and N_SADi. The pixel similarities C_ADi and N_SADi may include the center pixel similarity C_ADi and the neighboring pixel similarity N_SADi.

The center pixel similarity C_ADi may be a result of comparing the center pixel PC1 of the target block TBlock with the center pixel CCi of the comparison block CBlocki. In detail, the center pixel similarity C_ADi may be a reciprocal number of an absolute value of the difference between a value of the center pixel PC1 of the target block TBlock and a value of the center pixel CCi of the comparison block CBlocki.

The neighboring pixel similarity N_SADi may be a result of comparing neighboring pixels PN1 in the target block TBlock with neighboring pixels CNi in the comparison block CBlocki. In detail, the neighboring pixel similarity N_SADi may be a reciprocal number of the sum of absolute values of differences between the neighboring pixels PN1 in the target block TBlock and the neighboring pixels CNi in the comparison block CBlocki. The neighboring pixel similarity N_SADi may be calculated using the pattern descriptor PD. The pattern descriptor PD will be described in detail with reference to FIG. 6.

Figure 6:
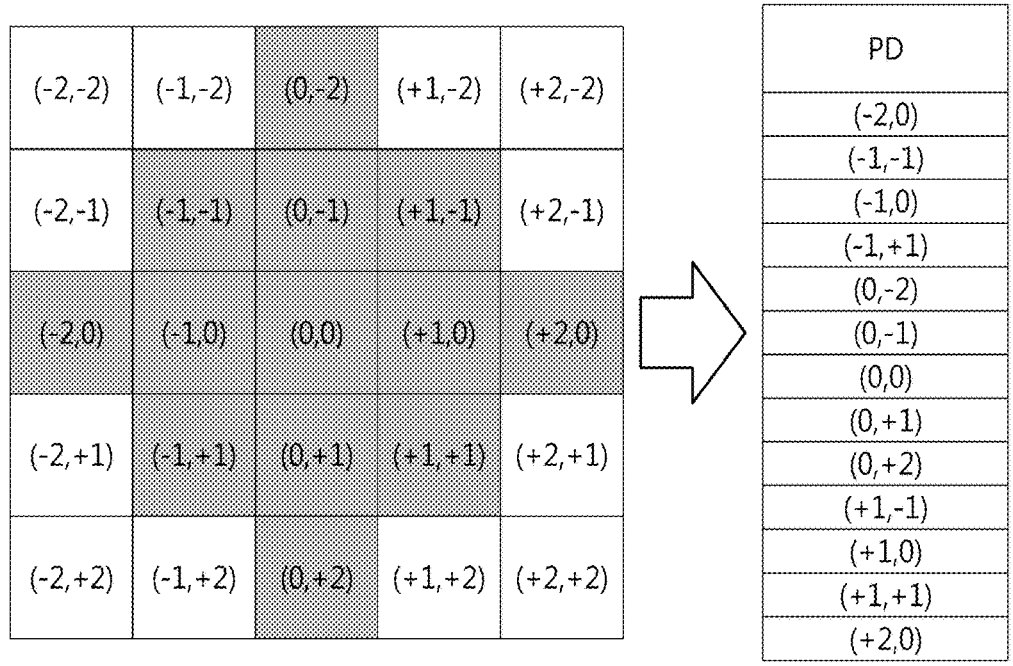
FIG. 6 is a diagram for explaining a pattern descriptor according to some embodiments of the present disclosure.

FIG. 6 is a diagram for explaining the pattern descriptor PD according to some embodiments of the present disclosure. The block similarity evaluator 132-i may use only some of the neighboring pixels PN1 and CNi, i.e., pixels corresponding to the pattern descriptor PD illustrated in FIG. 6. The pattern descriptor PD may include position information of the neighboring pixels PN1 and CNi. In other words, the block similarity evaluator 132-i may calculate the neighboring pixel similarity N_SADi using only neighboring pixels corresponding to the pattern descriptor PD among the neighboring pixels in the target block TBlock and the comparison block CBlocki.

Meanwhile, the pattern illustrated in FIG. 6 is just an example and the concepts described herein are not restricted thereto. The size and shape of the pattern may be modified in various ways and the pattern descriptor PD may also be modified according to the size and shape of the pattern.

Figure 7:
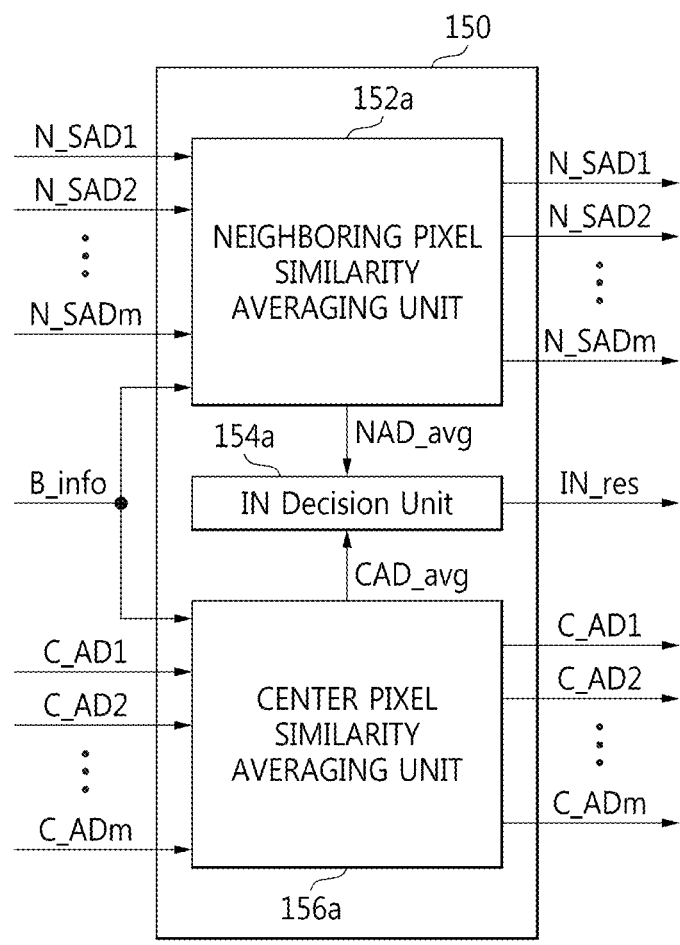
FIG. 7 is a detailed block diagram of an impulsive noise detection unit illustrated in FIG. 2.

FIG. 7 is a detailed block diagram of the impulsive noise detection unit 150 illustrated in FIG. 2. Referring to FIG. 7, the impulsive noise detection unit 150 may include a neighboring pixel similarity averaging unit 152a, a center pixel similarity averaging unit 156a, and an impulsive noise (IN) decision unit 154a.

The neighboring pixel similarity averaging unit 152a may calculate an average value NAD_avg of neighboring pixel similarities N_SAD1 through N_SADm. The average value NAD_avg may be calculated using the neighboring pixel similarities N_SAD1 through N_SADm received from the similarity evaluation unit 130 and the block information B_info. The neighboring pixel similarity averaging unit 152a may output the average value NAD_avg to the IN decision unit 154a. The average value NAD_avg may be defined by Equation 1:

$$\text{NAD\_avg} = \frac{\Sigma_i N\_SADi}{m \times (n-1)}, \quad (1)$$

where N_SADi is a neighboring pixel similarity, "m" is the number of comparison blocks for a target block, and "n" is the number of pixels existing in each of the comparison blocks.

The center pixel similarity averaging unit 156a may calculate an average value CAD_avg of center pixel similarities C_AD1 through C_ADm. The center pixel similarities C_AD1 through C_ADm are received from the similarity evaluation unit 130. The average value CAD_avg may be calculated using the center pixel similarities C_AD1 through C_ADm and the block information B_info. The center pixel similarity averaging unit 156a may output the average value CAD_avg to the IN decision unit 154a. The average value CAD_avg may be defined by Equation 2:

$$\text{CAD\_avg} = \frac{\Sigma_i C\_ADi}{m}, \quad (2)$$

where C_ADi is a center pixel similarity and "m" is the number of comparison blocks for a target block.

The IN decision unit 154a may determine whether an impulsive noise exists in the center pixel PC1 of the target block TBlock. The determination may be based on the average value NAD_avg received from the neighboring pixel similarity averaging unit 152a and the average value CAD_avg received from the center pixel similarity averaging unit 156a. The IN decision unit 154a may provide the determination result information IN_res to the weight adjustment unit 170. When the average value CAD_avg of center pixel similarities is less than the average value NAD_avg of neighboring pixel similarities, the IN decision unit 154a may determine that the impulsive noise exists in the center pixel PC1 of the target block TBlock and may output a first logic level (e.g., logic high) as the determination result information IN_res. When the average value CAD_avg of center pixel similarities is greater than the average value NAD_avg of neighboring pixel similarities, the IN decision unit 154a may determine that the impulsive noise does not exist in the center pixel PC1 of the target block TBlock and may output a second logic level (e.g., logic low) as the determination result information IN_res.

Alternatively, when the average value CAD_avg of center pixel similarities is less than the average value NAD_avg of neighboring pixel similarities and the difference between the average value CAD_avg and the average value NAD_avg is greater than a predetermined threshold value, the IN decision unit 154a may determine that the impulsive noise exists in the center pixel PC1 of the target block TBlock and may output a first set value as the determination result information IN_res. When the average value CAD_avg of center pixel similarities is greater than the average value NAD_avg of neighboring pixel similarities, the IN decision unit 154a may determine that the impulsive noise does not exist in the center pixel PC1 of the target block TBlock and may output a second set value as the determination result information IN_res. When the average value CAD_avg of center pixel similarities is less than the average value NAD_avg of neighboring pixel similarities and the difference between the average value CAD_avg and the average value. NAD_avg is less than the predetermined threshold value, the IN decision unit 154a may determine that it is not clear whether the impulsive noise exists in the center pixel PC1 of the target block TBlock and may output a third set value as the determination result information IN_res.

The third set value is between the first set value and the second set value. The third set value may be close to the second set value as the difference between the average value CAD_avg and the average value NAD_avg decreases and may be close to the first set value as the difference between the average value CAD_avg and the average value NAD_avg increases. The first set value may be "0". The second set value may be "1". The third set value may be set to a value between "0" and "1", which monotonically increases in proportion to the magnitude of the difference between the average value CAD_avg and the average value NAD_avg.

Figure 8:
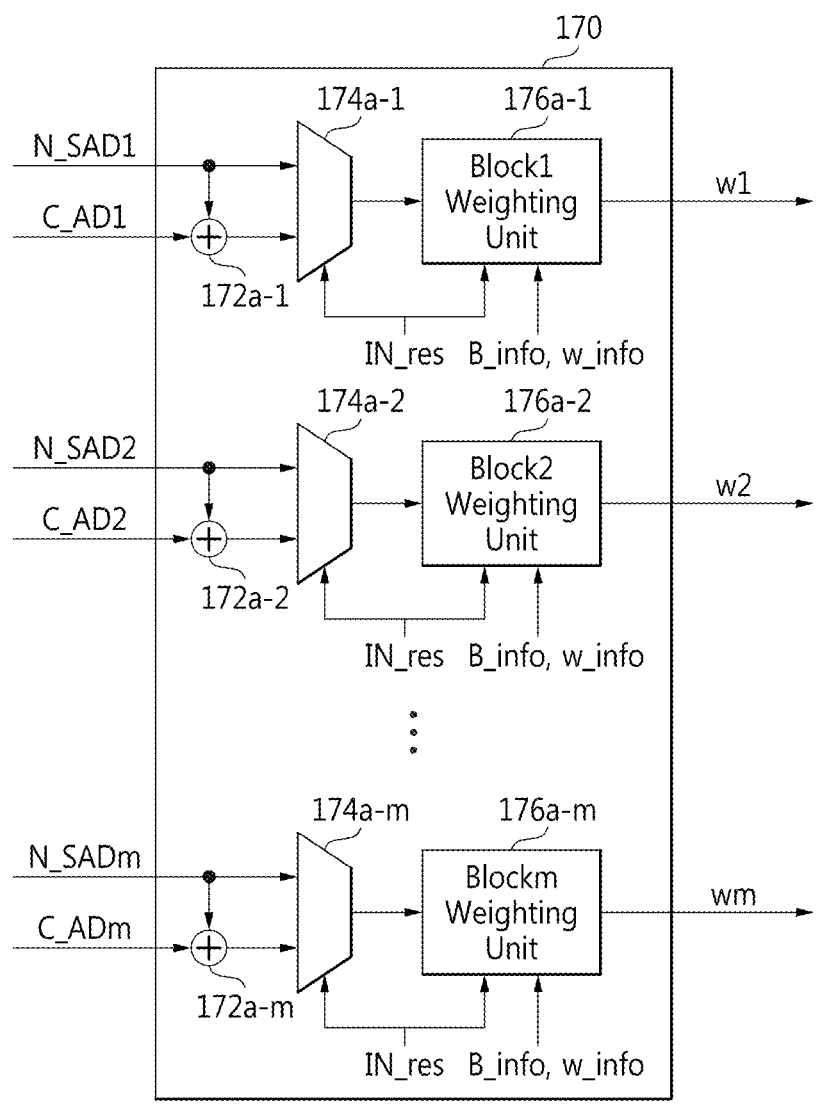
FIG. 8 is a detailed block diagram of a weight adjustment unit illustrated in FIG. 2.

FIG. 8 is a detailed block diagram of the weight adjustment unit 170 illustrated in FIG. 2. Referring to FIG. 8, the weight adjustment unit 170 may include first through m-th adders 172a-1 through 172a-m, first through m-th multiplexers 174a-1 through 174a-m, and first through m-th block weighting units 176a-1 through 176a-m. The structure and functions of the second through m-th adders 172a-2 through 172a-m are the same as those of the first adder 172a-1. The structure and functions of the second through m-th multiplexers 174a-2 through 174a-m are the same as those of the first multiplexer 174a-1. The structure and functions of the second through m-th block weighting units 176a-2 through 176a-m are the same as those of the first block weighting unit 176a-1. Thus, the description of the structure and functions of the weight adjustment unit 170 will be focused on the first adder 172a-1, the first multiplexer 174a-1, and the first block weighting unit 176a-1.

The first adder 172a-1 may add the neighboring pixel similarity N_SAD1 and the center pixel similarity C_AD1 and output an addition result to the first multiplexer 174a-1. The first multiplexer 174a-1 may output either the neighboring pixel similarity N_SAD1 or the addition result received from the first adder 172a-1 to the first block weighting unit 176a-1 according to the determination result information IN_res received from the impulsive noise detection unit 150. As described above with reference to FIG. 7, the determination result information IN_res generated from the impulsive noise detection unit 150 may be either the first logic level or the second logic level or may be one of the first through third set values.

The first multiplexer 174a-1 may output the neighboring pixel similarity N_SAD1 to the first block weighting unit 176a-1 when the determination result information IN_res is the first logic level (i.e., based on determining that the impulsive noise exists in the center pixel PC1 of the target block TBlock). The first multiplexer 174a-1 may output the addition result received from the first adder 172a-1 to the first block weighting unit 176a-1 when the determination result information IN_res is the second logic level (i.e., based on determining that the impulsive noise does not exist in the center pixel PC1 of the target block TBlock).

Alternatively, the first multiplexer 174a-1 may output the neighboring pixel similarity N_SAD1 to the first block weighting unit 176a-1 when the determination result information IN_res is the first set value or the third set value (i.e., based on determining that the impulsive noise exists in the center pixel PC1 of the target block TBlock or that it is unclear whether the impulsive noise exists or not). The first multiplexer 174a-1 may output the addition result received from the first adder 172a-1 to the first block weighting unit 176a-1 when the determination result information IN_res is the second set value (i.e., based on determining that the impulsive noise does not exist in the center pixel PC1 of the target block TBlock).

The first block weighting unit 176a-1 may generate and output the weight "w1" using the output value of the first multiplexer 174a-1, the determination result information IN_res received from the impulsive noise detection unit 150, the block information B_info, and the weight information W_info. The weight information W_info will be described in detail with reference to FIG. 9.

Figure 9:
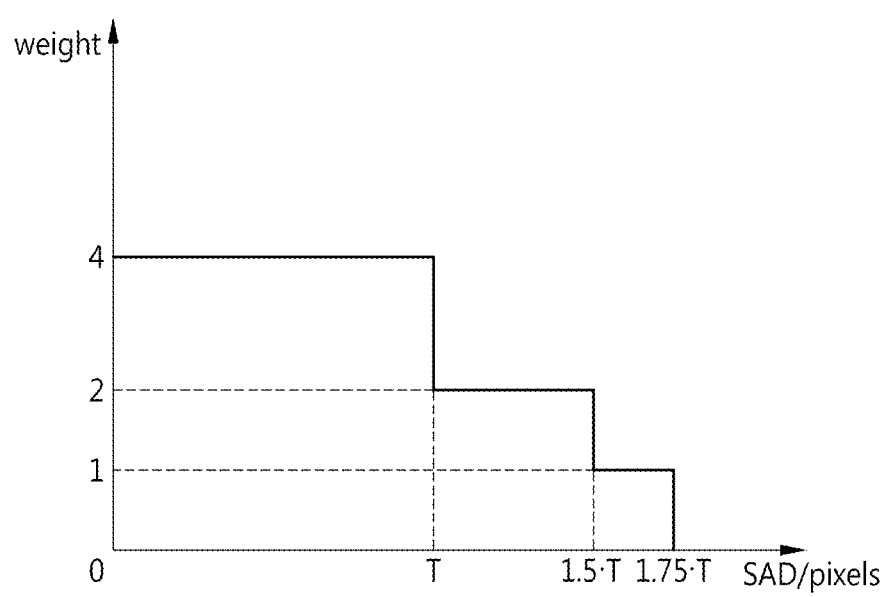
FIG. 9 is a diagram for explaining a weighting function used to generate weight information.

FIG. 9 is a diagram for explaining a weighting function used to generate the weight information W_info. An input of the weighting function may be a value obtained by normalizing an output value of the first multiplexer 174a-1.

When the output value of the first multiplexer 174a-1 is the neighboring pixel similarity N_SAD1, the normalized value may be obtained by dividing the neighboring pixel similarity N_SAD1 by m*(n−1), where "m" is the number of comparison blocks for a target block and "n" is the number of pixels existing in each of the comparison blocks. When the output value of the first multiplexer 174a-1 is the addition result, i.e., the sum of the neighboring pixel similarity N_SAD1 and the center pixel similarity C_AD1; the normalized value may be obtained by dividing the addition result by m*n.

An output of the weighting function may be a value corresponding to a predetermined range to which the normalized value belongs. When the normalized value belongs to a first range from 0 to T, the output of the weighting function may be 4. When the normalized value belongs to a second range from T to 1.5*T, the output of the weighting function may be 2. When the normalized value belongs to a third range from 1.5*T to 1.75*T, the output of the weighting function may be 1. When the normalized value belongs to a fourth range of 1.75*T and over, the output of the weighting function may be 0.

Figure 10:
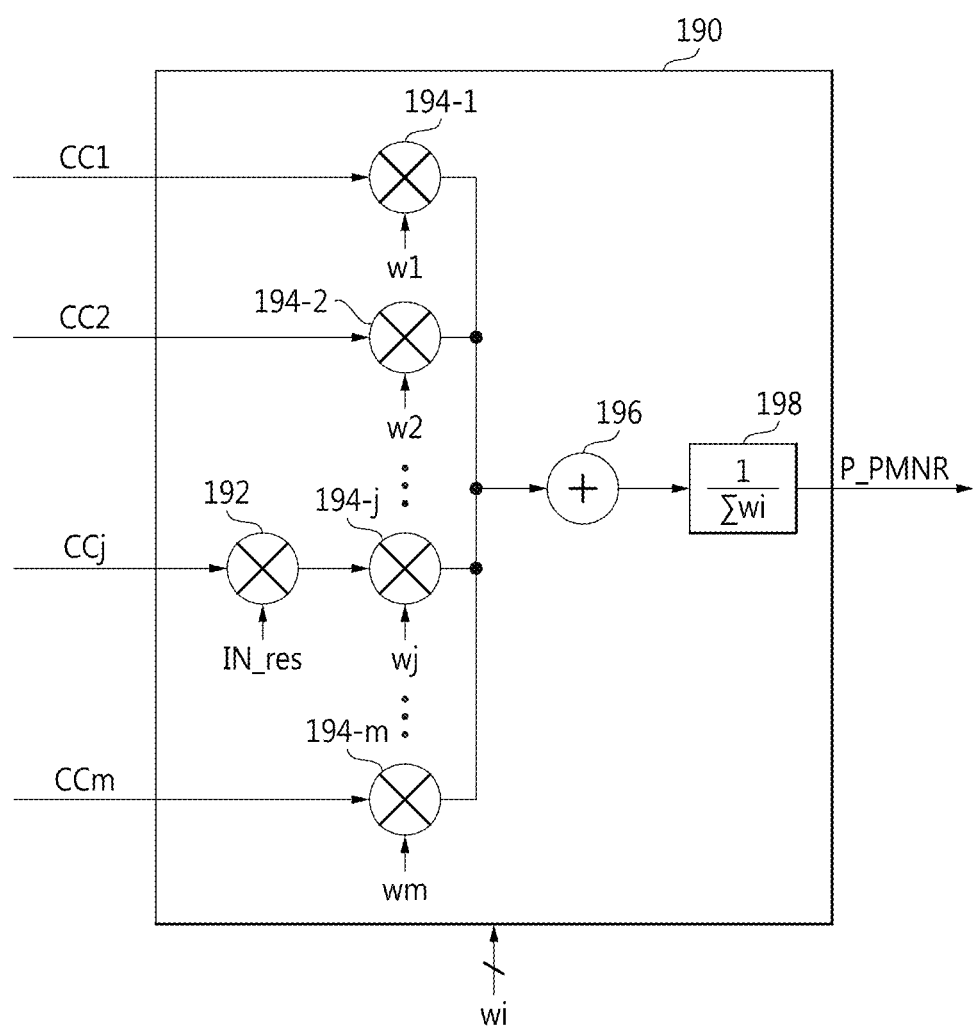
FIG. 10 is a detailed block diagram of a weighted averaging unit illustrated in FIG. 2.

FIG. 10 is a detailed block diagram of the weighted averaging unit 190 illustrated in FIG. 2. Referring to FIGS. 2 and 10, the weighted averaging unit 190 may receive the center pixels CC1 through CCm of the respective comparison blocks CBlock1 through CBlockm from the pre-processing unit 110, the weights "w1" through "wm" from the weight adjustment unit 170, and the determination result information IN_res from the impulsive noise detection unit 150. The weighted averaging unit 190 may calculate and output the weighted average P_PMNR of the center pixels CC1 through CCm of the comparison blocks CBlock1 through CBlockm using the center pixels CC1 through CCm, the weights "w1" through "wm", and the determination result information IN_res. At this time, the weighted averaging unit 190 may use the determination result information IN_res when processing the center pixel CCj of the comparison block CBlockj which is the same as the target block TBlock among the comparison blocks CBlock1 through CBlockm. The weighted averaging unit 190 may include multipliers 192 and 194-1 through 194-m, an adder 196, and a divider 198 in order to calculate the weighted average P_PMNR of the center pixels CC1 through CCm.

The multipliers 194-1 through 194-(j−1) and 194-(j+1) through 194-m (where "j" is an integer of at least 1 and at most "m") may multiply the values of the center pixels CC1 through CC(j−1) and CC(j+1) through CCm, respectively, by the weights w1 through w(j−1) and w(j+1) through wm, respectively, and may output multiplication result values to the adder 196. The multiplier 192 may multiply the value of the center pixel CCj of the comparison block CBlockj which is the same as the target block TBlock by the determination result information IN_res and may output a multiplication result value to the multiplier 194-j. The multiplier 194-j may multiply the multiplication result value received from the multiplier 192 by the weight wj and may output a multiplication result value to the adder 196.

The adder 196 may add the result values received from the respective multipliers 194-1 through 194-m and may output an addition result value to the divider 198. The divider 198 may divide the addition result value by the sum of the weights w1 through wm to output the weighted average P_PMNR.

Figure 11:
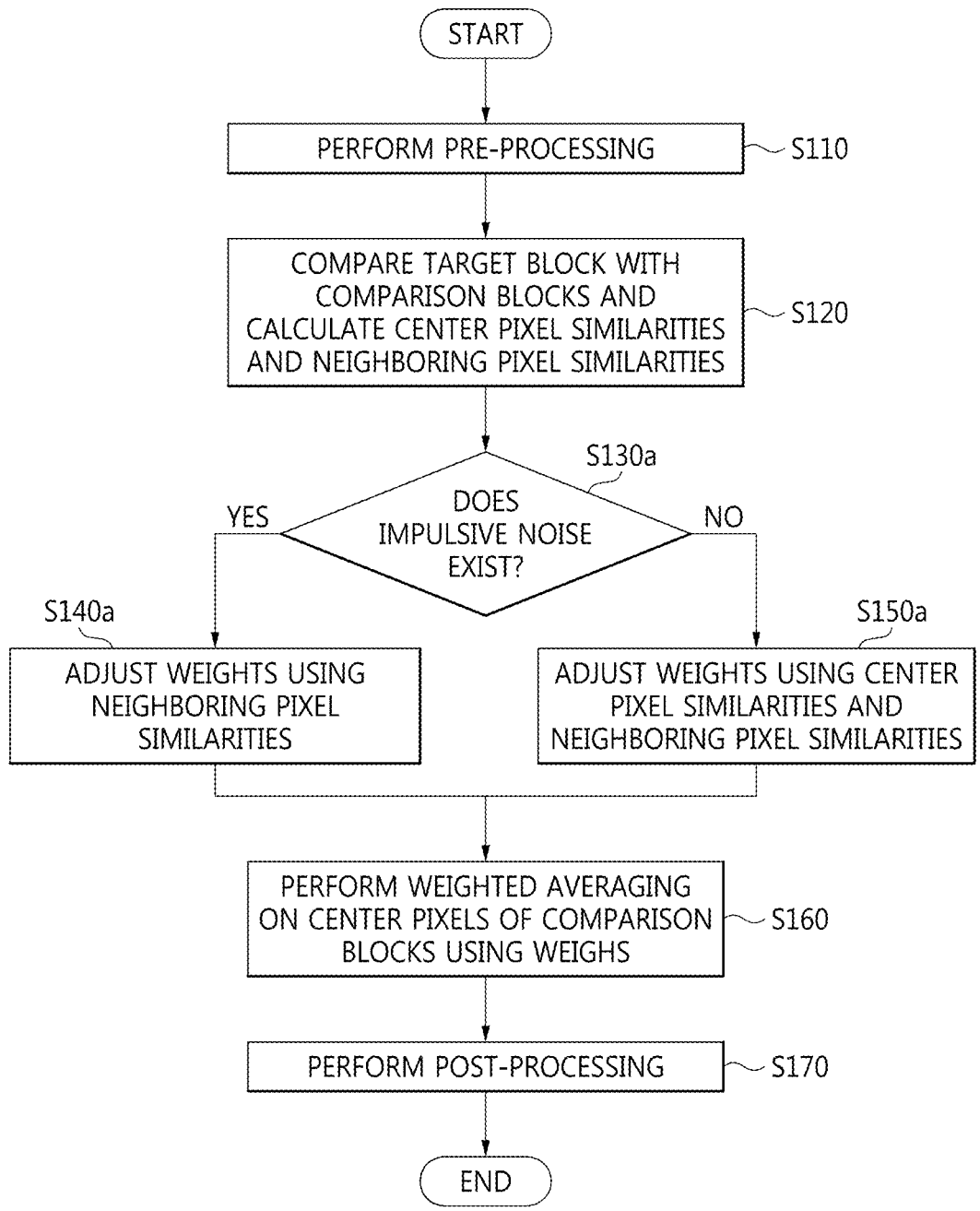
FIG. 11 is a flowchart of a method of removing noise from an image according to some embodiments of the present disclosure.

FIG. 11 is a flowchart of a method of removing noise from an image according to some embodiments of the present disclosure. Referring to FIGS. 1, 2, and 11, the image data 1 output from the CMOS image sensor 20 may be pre-processed in operation S100. Operation S100 may be performed by the pre-processing unit 110. The pre-processing unit 110 may perform geometrical correction and optical correction on the image data I.

Thereafter, the target block TBlock may be compared with the comparison blocks CBlock1 through CBlockm to calculate the center pixel similarities C_AD1 through C_ADm and the neighboring pixel similarities N_SAD1 through N_SADm in operation S120. Operation S120 may be performed by the similarity evaluation unit 130. The target block TBlock and the comparison blocks CBlock1 through CBlockm, are received from the pre-processing unit 110. The pattern descriptor PD is received from the image memory 30. The similarity evaluation unit 130 may calculate the center pixel similarities C_AD1 through C_ADm and the neighboring pixel similarities N_SAD1 through N_SADm using the target block TBlock and the comparison blocks CBlock1 through CBlockm, and the pattern descriptor PD. The similarity evaluation unit 130 may output the center pixel similarities C_AD1 through C_ADm and the neighboring pixel similarities N_SAD1 through N_SADm to the impulsive noise detection unit 150.

Thereafter, whether an impulsive noise exists in the image may be determined in operation S130a. Operation S130a may be performed by the impulsive noise detection unit 150. The impulsive noise detection unit 150 may determine whether an impulsive noise exists in the center pixel of the target block TBlock. The center pixel similarities C_AD1 through C_ADm and the neighboring pixel similarities N_SAD1 through N_SADm are received from the similarity evaluation unit 130. The block information B_info is received from the image memory 30. The determination may be based on the center pixel similarities C_AD1 through C_ADm and the neighboring pixel similarities N_SAD1 through N_SADm and the block information B_info. The impulsive noise detection unit 150 may output the determination result information IN_res to the weight adjustment unit 170.

When it is determined that an impulsive noise exists in the image (i.e., in case of YES) in operation S130a, each weight wi may be adjusted using a corresponding one of the neighboring pixel similarities N_SAD1 through N_SADm in operation S140a. When it is determined that an impulsive noise does not exist in the image (i.e., in case of NO) in operation S130a, each weight wi may be adjusted using the sum of a corresponding one of the center pixel similarities C_AD1 through C_ADm and a corresponding one of the neighboring pixel similarities N_SAD1 through N_SADm in operation S150a.

Operations S140a and 150a may be performed by the weight adjustment unit 170. The weight adjustment unit 170 may adjust the weights w1 through wm respectively applied to the values of the center pixels CC1 through CCm of the comparison blocks CBlock1 through CBlockm. The center pixel similarities C_AD1 through C_ADm and the neighboring pixel similarities N_SAD1 through N_SADm are received from the impulsive noise detection unit 150. The determination result information IN_res is received from the impulsive noise detection unit 150. The weights w1 through wm may be adjusted using the center pixel similarities C_AD1 through C_ADm and the neighboring pixel similarities N_SAD1 through N_SADm, the determination result information IN_res, the block information B_info, and the weight information W_info. The weight adjustment unit 170 may output the weights w1 through wm that have been adjusted to the weighted averaging unit 190.

Thereafter, weighted averaging may be performed on the values of the center pixels CC1 through CCm of the comparison blocks CBlock1 through CBlockm using the weights w1 through wm in operation S160. Operation S160 may be performed by the weighted averaging unit 190.

The values of the center pixels CC1 through CCm of the comparison blocks CBlock1 through CBlockm are received from the pre-processing unit 110. The weights w1 through wm are received from the weight adjustment unit 170. The weighted averaging unit 190 may perform the weighted averaging using the values of the center pixels CC1 through CCm of the comparison blocks CBlock1 through CBlockm, the weights w1 through wm, and the determination result information IN_res output from the impulsive noise detection unit 150. The weighted averaging unit 190 may output the weighted average P_PMNR.

As described above with reference to FIGS. 1 through 11, center pixels, e.g., PC1 and CCi are processed separately from neighboring pixels, e.g., PN1 and CC1 through CCm when the target block TBlock is compared with the comparison blocks CBlock1 through CBlockm in the method of removing noise from an image. In addition, all of noises (e.g., an impulsive noise and a Gaussian noise) having different characteristics are removed from the image data I at a time as a result of performing the method. According to some embodiments of the present disclosure, the method removes noises having different characteristics from the image data I, thereby reducing complexity of computation and power consumption necessary for the noise removal.

Figure 12:
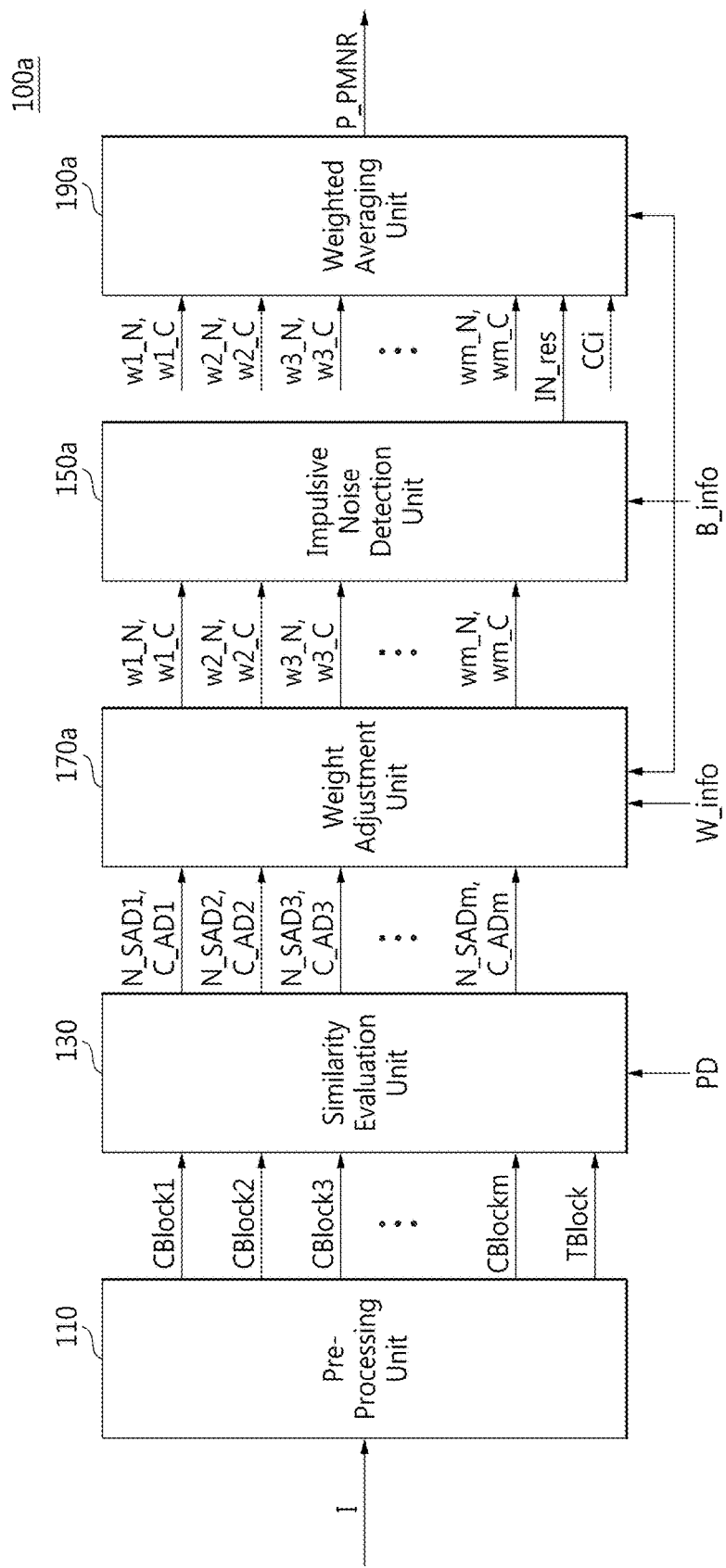
FIG. 12 is a schematic block diagram of a noise removing device according to other embodiments of the present disclosure.
Figure 13:
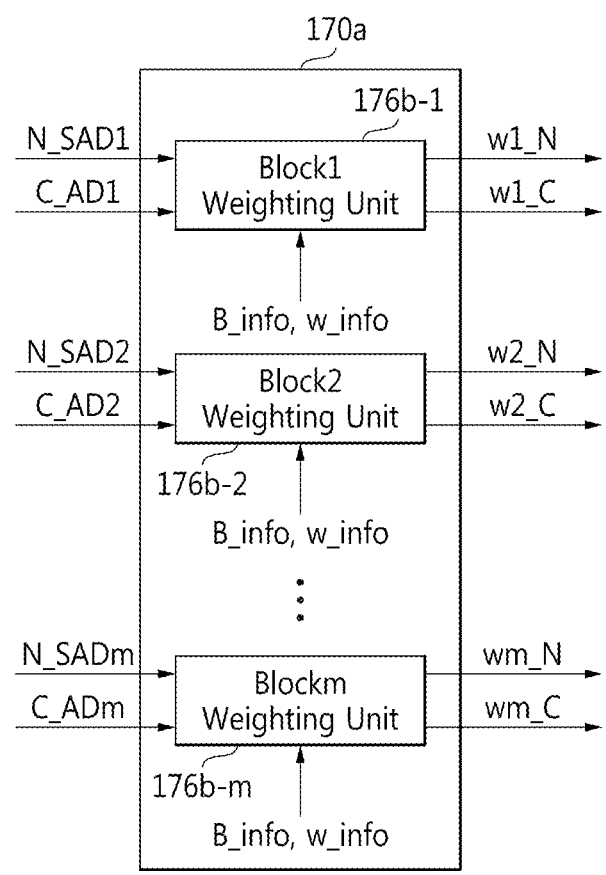
FIG. 13 is a detailed block diagram of a weight adjustment unit illustrated in FIG. 12.
Figure 14:
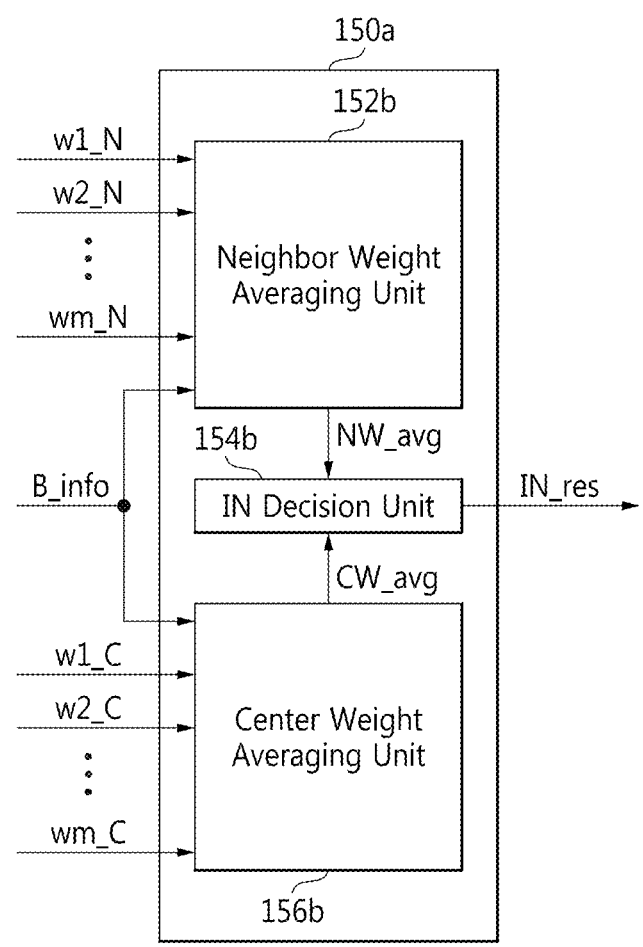
FIG. 14 is a detailed block diagram of an impulsive noise detection unit illustrated in FIG. 12.
Figure 15:
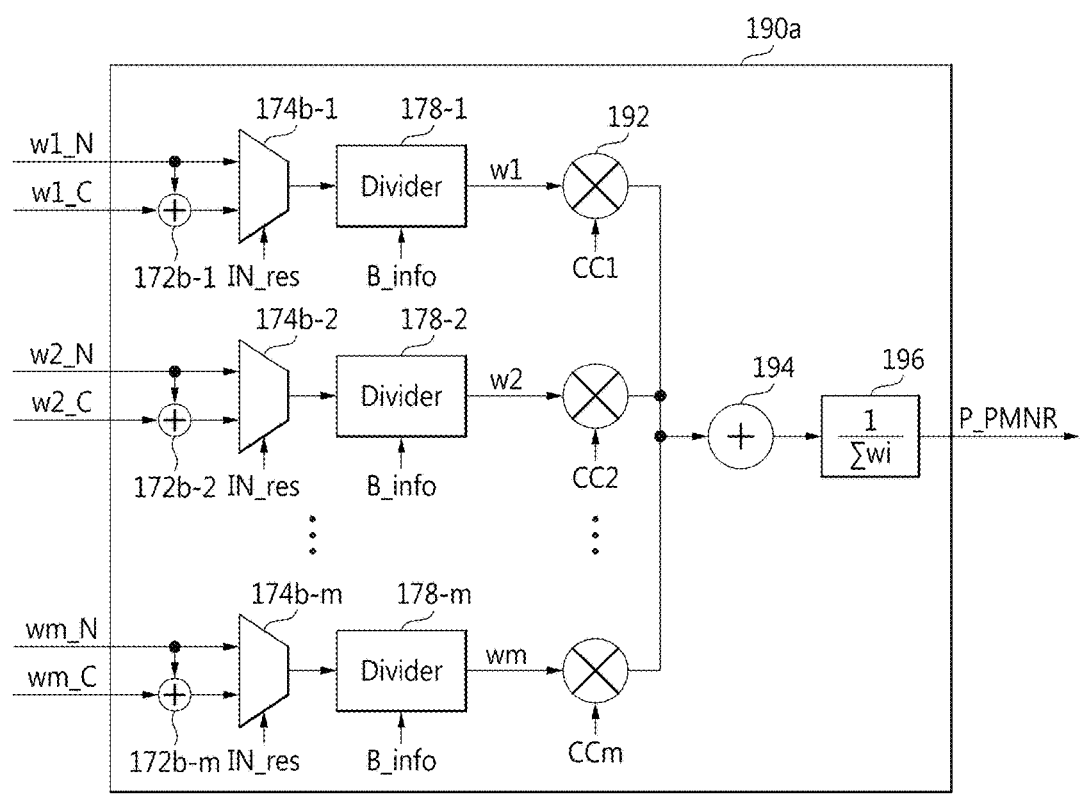
FIG. 15 is a detailed block diagram of a weighted averaging unit illustrated in FIG. 12.

FIG. 12 is a schematic block diagram of a noise removing device 100a according to other embodiments of the present disclosure. FIG. 13 is a detailed block diagram of a weight adjustment unit 170a illustrated in FIG. 12. FIG. 14 is a detailed block diagram of an impulsive noise detection unit 150a illustrated in FIG. 12. FIG. 15 is a detailed block diagram of a weighted averaging unit 190a illustrated in FIG. 12. Elements denoted by like numbers between the noise removing devices 100 and 100a illustrated in FIGS. 2 and 12 perform the same functions. Thus, the detailed descriptions of the like elements will be omitted and differences between the noise removing devices 100 and 100a will be mainly described.

Referring to FIG. 12, the noise removing device 100a may include the pre-processing unit 110, the similarity evaluation unit 130, the weight adjustment unit 170a, the impulsive noise detection unit 150a, and the weighted averaging unit 190a.

Center pixel similarities C_AD1 through C_ADm and neighboring pixel similarities N_SAD1 through N_SADm are output from the similarity evaluation unit 130. The weight adjustment unit 170a may generate center pixel weights w1_C through wm_C and neighboring pixel weights w1_N through wm_N based on the center pixel similarities C_AD1 through C_ADm and the neighboring pixel similarities N_SAD1 through N_SADm, the weight information W_info, and the block information B_info. The weight adjustment unit 170a will be described in detail with reference to FIG. 13.

Referring to FIG. 13, the weight adjustment unit 170a may perform similar functions to the weight adjustment unit 170 illustrated in FIGS. 2 and 8. However, unlike the weight adjustment unit 170 illustrated in FIGS. 2 and 8, the weight adjustment unit 170a separately generate the center pixel weights w1_C through wm_C and the neighboring pixel weights w1_N through wm_N.

The center pixel weights w1_C through wm_C and the neighboring pixel weights w1_N through wm_N are received from the weight adjustment unit 170a. Block information B_info is received from the image memory 30. The impulsive noise detection unit 150a may determine whether an impulsive noise exists in the center pixel of the target block TBlock. The determination may be based on the center pixel weights w1_C through wm_C and the neighboring pixel weights w1_N through wm_N, and the block information B_info. The impulsive noise detection unit 150a may output the determination result information IN_res to the weighted averaging unit 190a. The detailed structure of the impulsive noise detection unit 150a is illustrated in FIG. 14.

Referring to FIG. 14, the impulsive noise detection unit 150a may perform similar functions to the impulsive noise detection unit 150 illustrated in FIGS. 2 and 7. However, unlike the impulsive noise detection unit 150 illustrated in FIGS. 2 and 7, the impulsive noise detection unit 150a determines whether an impulsive noise exists in the center pixel of the target block TBlock using the center pixel weights w1_C through wm_C and the neighboring pixel weights w1_N through wm_N received from the weight adjustment unit 170a.

Center pixel weights w1_C through wm_C and neighboring pixel weights w1_N through wm_N are received from the weight adjustment unit 170a. The weighted averaging unit 190a may perform weighted averaging using the center pixel weights w1_C through wm_C and the neighboring pixel weights w1_N through wm_N, the block information B_info, and the values of the center pixels CC1 through CCm of the comparison blocks CBlock1 through CBlockm. The weighted averaging unit 190a may output the weighted average P_PMNR. The detailed structure of the weighted averaging unit 190a is illustrated in FIG. 15.

Referring to FIG. 15, the center pixel weights w1_C through wm_C and neighboring pixel weights w1_N through wm_N are received from the weight adjustment unit 170a. The weighted averaging unit 190a may perform similar functions to the weighted averaging unit 190 illustrated in FIGS. 2 and 10. However, unlike the weighted averaging unit 190 illustrated in FIGS. 2 and 10, the weighted averaging unit 190a outputs the weighted average P_PMNR using the center pixel weights w1_C through wm_C and the neighboring pixel weights w1_N through wm_N.

Figure 16:
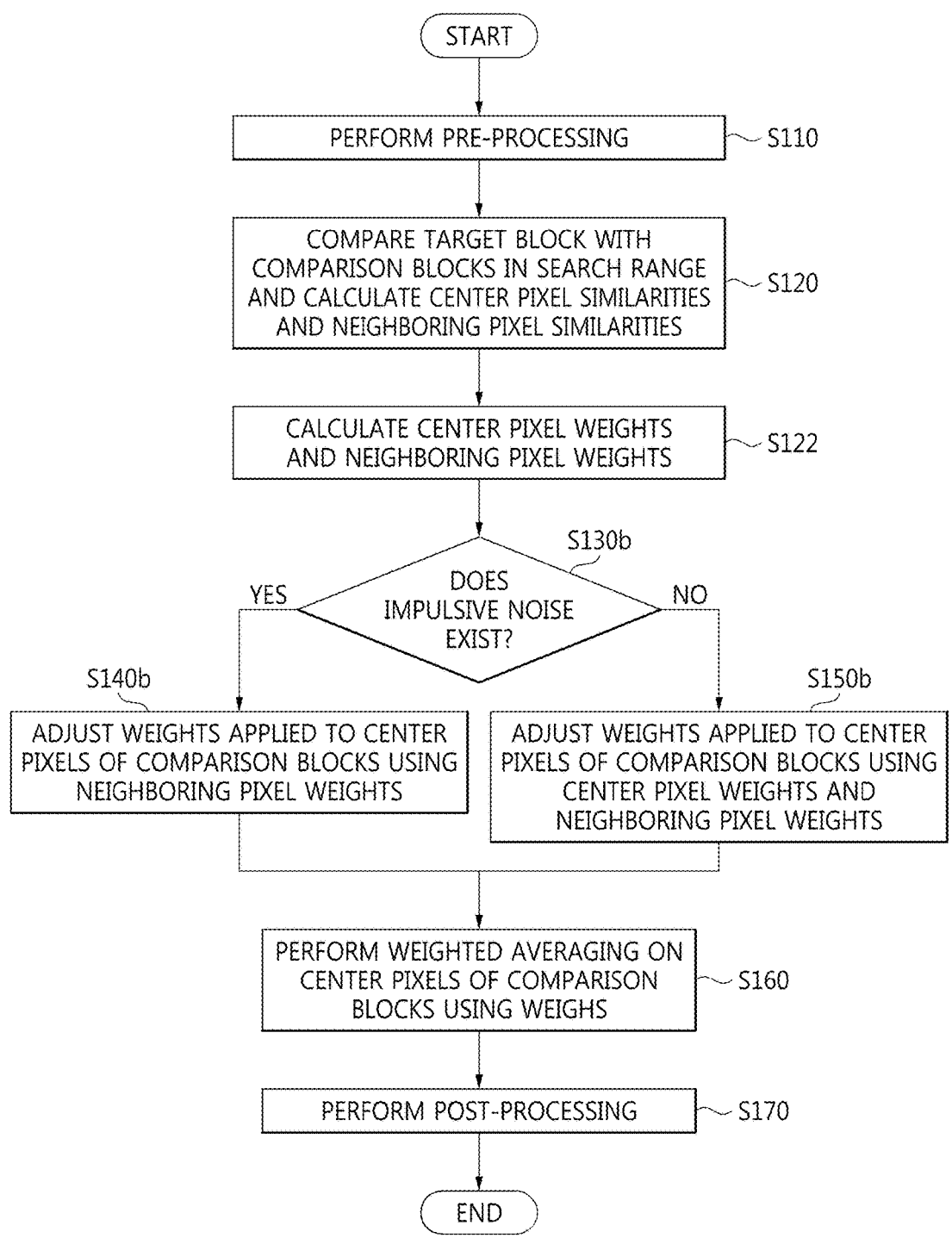
FIG. 16 is a flowchart of a method of removing noise from an image according to other embodiments of the present disclosure.

FIG. 16 is a flowchart of a method of removing noise from an image according to other embodiments of the present disclosure. Operations denoted by like numbers in FIGS. 11 and 16 perform the same functions. Thus, the detailed descriptions of these operations will be omitted and differences between the methods illustrated in FIGS. 11 and 16 will be mainly described.

Referring to FIGS. 1, 12, and 16, differently from the method illustrated in FIG. 11, the method illustrated in FIG. 16 may also include calculating the center pixel weights w1_C through wm_C and the neighboring pixel weights w1_N through wm_N in operation S122 after operation S120. The method illustrated in FIG. 16 may include operations S130b, 140b, and 150b respectively corresponding to operations 130a, 140a, and 150a illustrated in FIG. 11. Differently from operations S130a, 140a, and 150a performed based on the center pixel similarities C_AD1 through C_ADm and the neighboring pixel similarities N_SAD1 through N_SADm in the method illustrated in FIG. 11; operations S130b, 140b, and 150b illustrated in FIG. 16 are performed based on the center pixel weights w1_C through wm_C and the neighboring pixel weights w1_N through wm_N.

Figure 17:
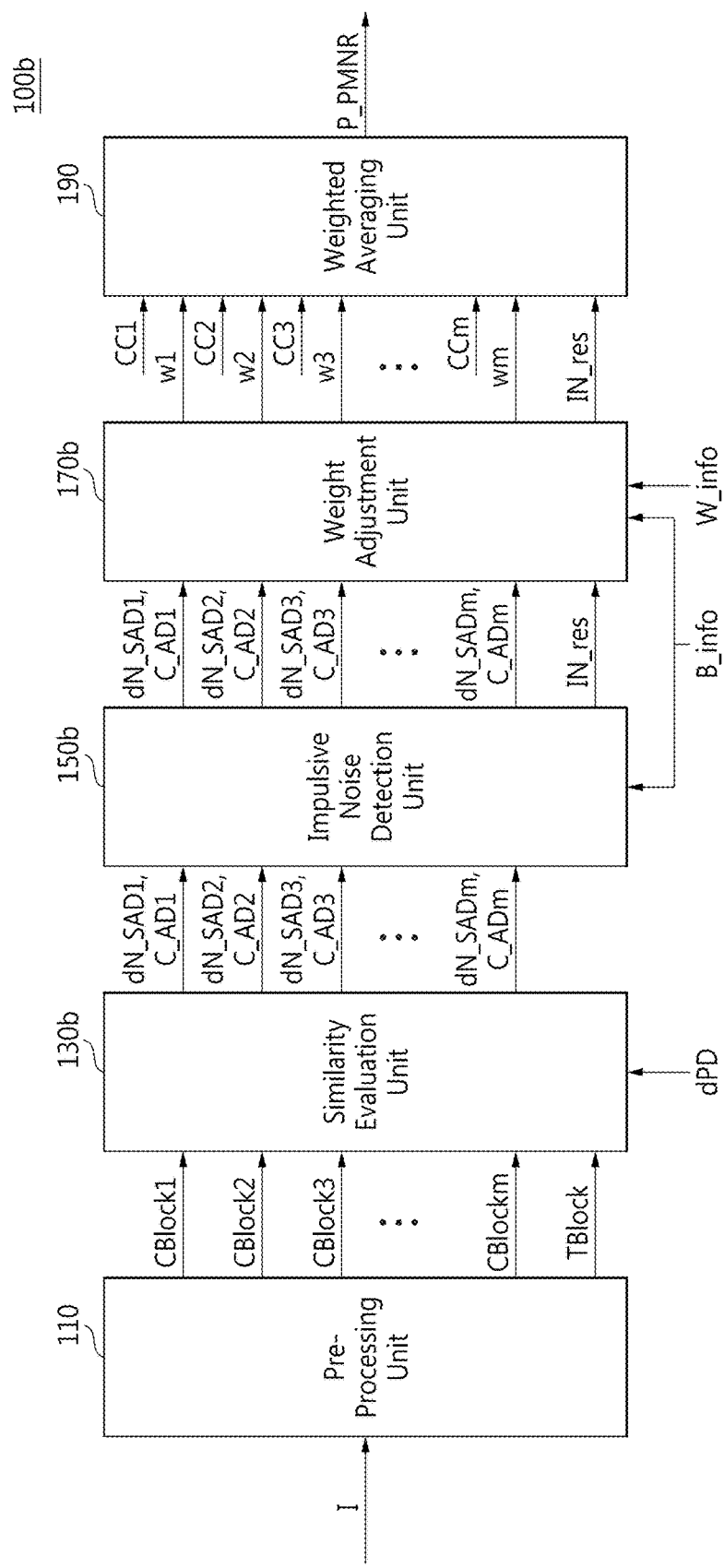
FIG. 17 is a schematic block diagram of a noise removing device according to further embodiments of the present disclosure.

FIG. 17 is a schematic block diagram of a noise removing device 100b according to further embodiments of the present disclosure. Elements denoted by like numbers between the noise removing devices 100 and 100b illustrated in FIGS. 2 and 17 perform the same functions. Thus, the detailed descriptions of the like elements will be omitted and differences between the noise removing devices 100 and 100b will be mainly described. Referring to FIG. 17, the noise removing device 100b may include the pre-processing unit 110, a similarity evaluation unit 130b, an impulsive noise detection unit 150b, a weight adjustment unit 170b, and the weighted averaging unit 190.

The similarity evaluation unit 130b may compare the target block TBlock with the comparison blocks CBlock1 through CBlockm received from the pre-processing unit 110. The similarity evaluation unit 130b may calculate pixel similarities C_ADi and dN_SADi (where "i" is an integer of at least 1 and at most "m"). The similarity evaluation unit 130b may output the pixel similarities C_ADi and dN_SADi to the impulsive noise detection unit 150b. The similarity evaluation unit 130b may perform similar functions to the similarity evaluation unit 130 illustrated in FIGS. 2 and 4. However, unlike the similarity evaluation unit 130 illustrated in FIGS. 2 and 4, the similarity evaluation unit 130b uses a directional pattern descriptor dPD received from the image memory 30 to calculate the neighboring pixel similarity dN_SADi. The directional pattern descriptor dPD will be described in detail with reference to FIG. 18.

Figure 18:
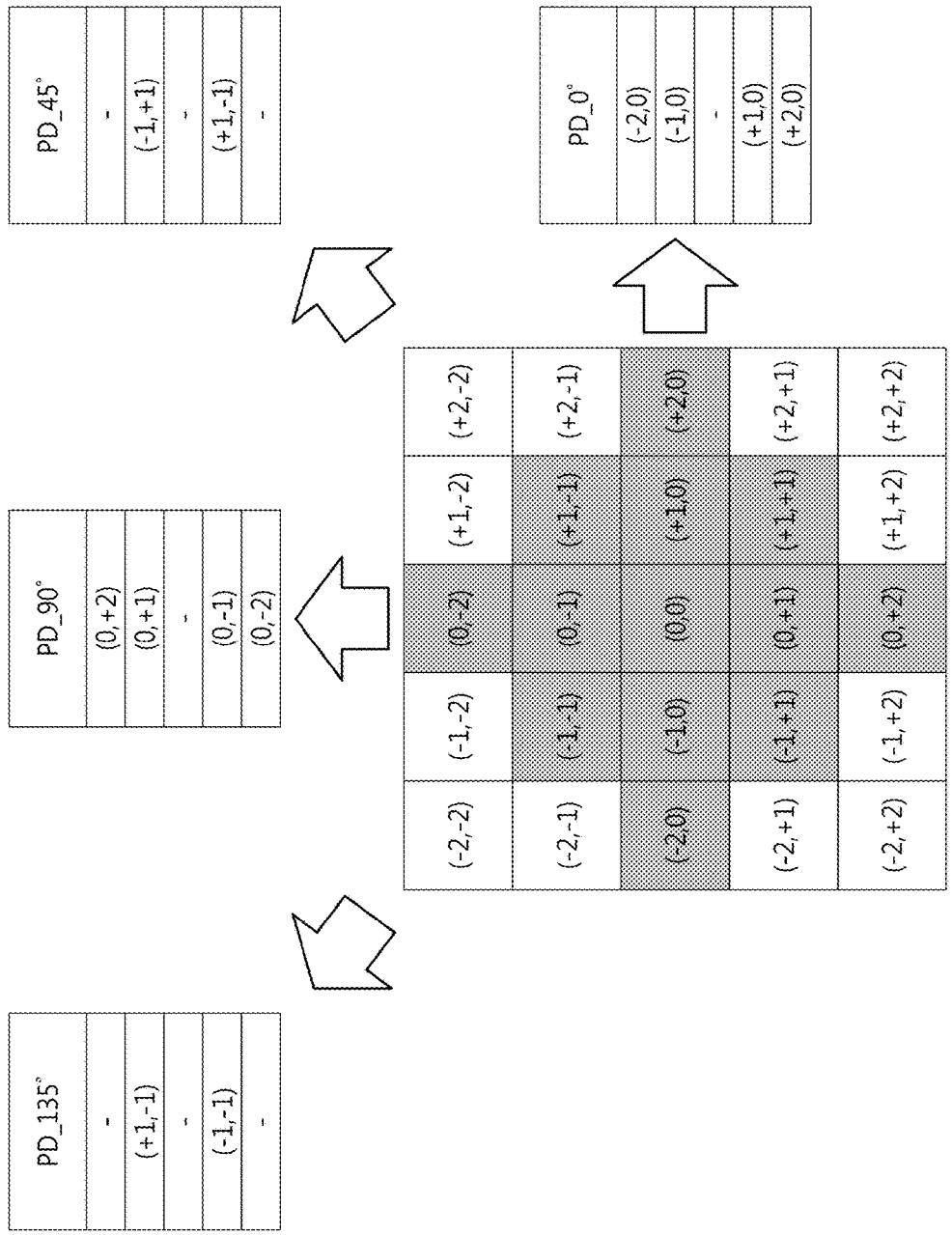
FIG. 18 is a diagram for explaining a directional pattern descriptor according to some embodiments of the present disclosure.

FIG. 18 is a diagram for explaining the directional pattern descriptor dPD according to some embodiments of the present disclosure. The directional pattern descriptor dPD may include multiple direction pattern descriptors PD_0°, PD_45°, PD_90°, and PD_135° for different directions. Each direction pattern descriptor may include position information of neighboring pixels placed in one of horizontal, vertical and diagonal directions from each of the center pixel PC1 of the target block TBlock and the center pixels CC1 through CCm of the comparison blocks CBlock1 through CBlockm.

The directional pattern descriptor dPD illustrated in FIG. 18 is just an example and pattern descriptions/descriptors are not restricted thereto. The number of directions may be changed and the number of direction pattern descriptors may also be changed according to the number of directions.

The impulsive noise detection unit 150b may determine whether an impulsive noise exists in the center pixel PC1 of the target block TBlock using the pixel similarities C_ADi and dN_SADi received from the similarity evaluation unit 130b and the block information B_info received from the image memory 30. The impulsive noise detection unit 150b may output the determination result information IN_res to the weight adjustment unit 170b. The impulsive noise detection unit 150b may perform similar functions to the impulsive noise detection unit 150 illustrated in FIGS. 2 and 7. However, unlike the impulsive noise detection unit 150 illustrated in FIGS. 2 and 7, the impulsive noise detection unit 150b uses the directional neighboring pixel similarity dN_SADi instead of the neighboring pixel similarity N_SADi.

Pixel similarities C_AD1 through C_ADm and dN_SAD1 through dN_SADm may be received from the impulsive noise detection unit 150b. The determination result information IN_res may also be received from the impulsive noise detection unit 150b The weight adjustment unit 170b may adjust the weight wi applied to the value of the center pixel of each of the comparison blocks CBlock1 through CBlockm. To adjust the weight wi, the weight adjustment unit 170b may use pixel similarities C_AD1 through C_ADm and dN_SAD1 through dN_SADm, the determination result information IN_res, the block information B_info, and the weight information W_info. The weight adjustment unit 170b may output the weights w1 through wm that have been adjusted to the weighted averaging unit 190.

The weight adjustment unit 170b may perform similar functions to the weight adjustment unit 170 illustrated in FIGS. 2 and 8. However, unlike the weight adjustment unit 170 illustrated in FIGS. 2 and 8, the weight adjustment unit 170b uses the directional neighboring pixel similarity dN_SADi instead of the neighboring pixel similarity N_SADi.

Figure 19:
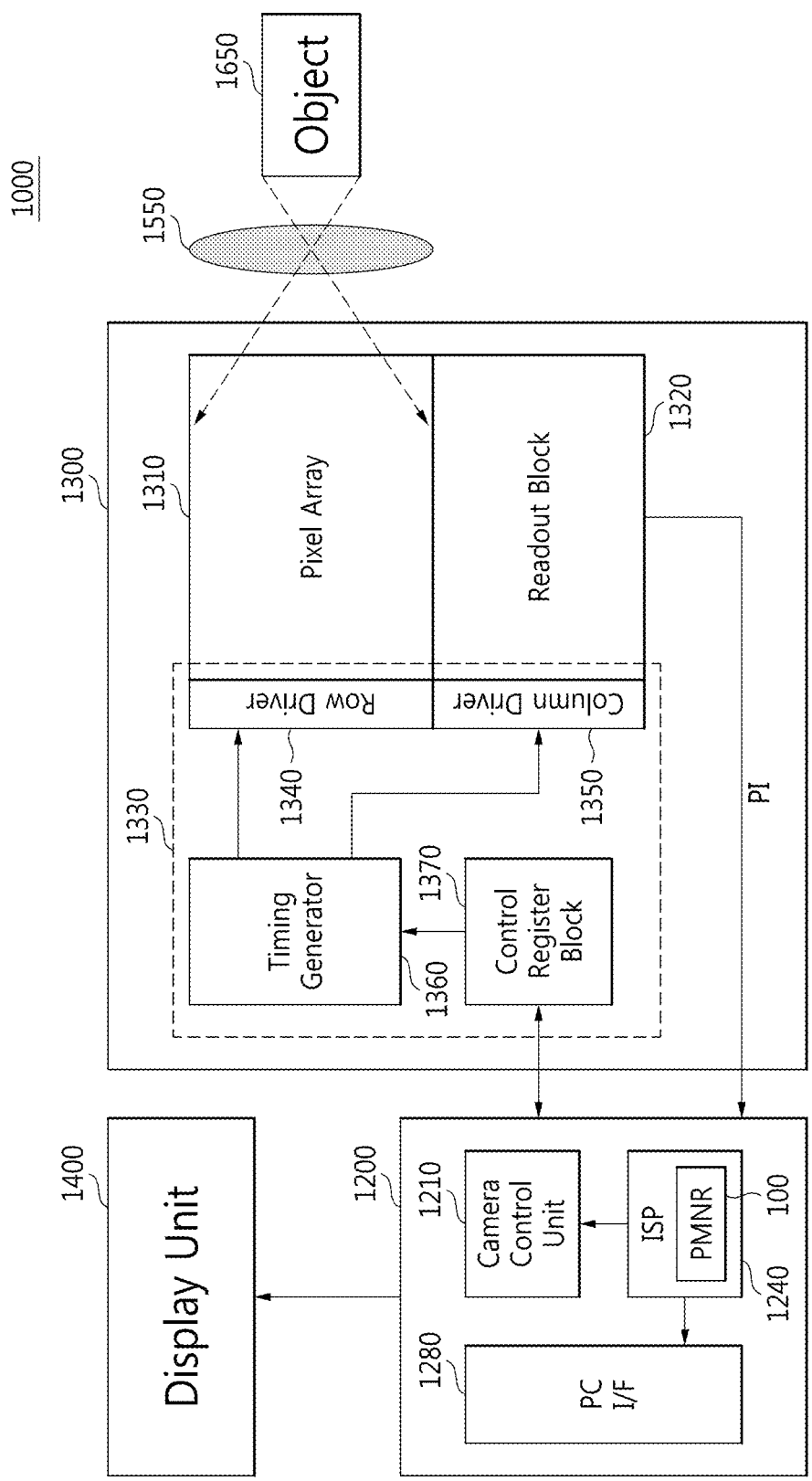
FIG. 19 is a block diagram of an image processing system according to other embodiments of the present disclosure.

FIG. 19 is a block diagram of an image processing system 1000 according to other embodiments of the present disclosure. The image processing system 1000 may include an image sensor 1300, a digital image processor (DSP) 1200, and a lens 1550.

The image sensor 1300 may generate pixel data PI corresponding to the intensity of incident light received through the lens 1550. The image sensor 1300 may include a pixel array 1310, a readout block 1320, and a control unit 1330.

The pixel array 1310 may include multiple pixels each of which accumulates photocharges generated in response to light, which is reflected from an object 1650 and received through the lens 1550. The pixel array 1310 generates an electrical signal corresponding to the photocharges. The pixels may be arranged in a matrix of "a" rows and "b" columns, where "a" is an integer of at least 1 and "b" is an integer of at least 1. Each of the pixels includes multiple transistors and multiple photoelectric conversion elements. A photoelectric conversion element may be a photo diode or a pinned photo diode. The pixel array 1310 senses light using the photoelectric conversion elements and converts the light into electrical signals. The pixels may be referred to as image pixels in the respect that the pixels generate signals corresponding to a captured image.

The readout block 1320 may remove noise (e.g., reset noise) from an electrical signal generated by each pixel and then perform analog-to-digital conversion of the electrical signal. The readout block 1320 may temporarily store the pixel data PI corresponding to the result of the analog-to-digital conversion of the electrical signal and then amplify and output the pixel data PI. The readout block 1320 may include an analog-to-digital converter (ADC) (not shown) which removes noise and performs analog-to-digital conversion, memory (e.g., static random access memory (SRAM)) (not shown) which temporarily stores the pixel data PI, and a buffer (not shown) which amplifies and output the pixel data PI.

The control unit 1330 may generate and provide multiple control signals for controlling the operations of the pixel array 1310 and the readout block 1320. The control unit 1330 may include a row driver 1340, a column driver 1350, a timing generator 1360, and a control register block 1370.

The row driver 1340 drives the pixel array 1310 in row units. In other words, pixels in one row may be provided with the same control signal. In other words, the row driver 1340 may decode a control signal output from the timing generator 1360 and provide control signals for the pixel array 1310. The column driver 1350 may generate multiple control signals according to the control of the timing generator 1360 and may control the operation of the readout block 1320.

The timing generator 1360 may apply a control signal to the row driver 1340 and the column driver 1350 to control the operations or timings of the row driver 1340 and the column driver 1350. The timing generator 1360 may generate a control signal or a clock signal to be applied to the row driver 1340 and the column driver 1350 using a control signal or a clock signal received from an external device (e.g., a host).

The control register block 1370 operates according to the control of a camera control unit 1210 and may store or buffer the control signal or the clock signal. The control register block 1370 may control the operations of the elements 1340, 1350, and 1360 of the image sensor 1300.

The pixel data PI may be a signal having a form of a stream of sequential digital values corresponding to respective pixels included in the pixel array 1310. When the pixel array 1310 includes pixels arranged in a matrix of ten rows and ten columns, the pixel data PI is a signal having a form of a stream of 100 digital values. The 100 digital values are obtained by converting an electrical signals output from a pixel in the first row and in the first column into a digital form to a pixel in the tenth row and in the tenth column into a digital form.

The digital image processor 1200 may generate image data by processing pixels sensed and output by the image sensor 1300 and output the image data to a display unit 1400. The digital image processor 1200 may include the camera control unit 1210, an ISP 1240, and a personal computer interface (PC I/F) 1280.

The camera control unit 1210 controls the control register block 1370. The camera control unit 1210 may control the control register block 1370 using an inter-integrated circuit ($I^2C$), but the scope of camera control is not restricted to the current embodiments.

The ISP 1240 processes the pixel data PI output from the image sensor 1300 into image data nice for people to look at and outputs the image data to the display unit 1400 through the PC I/F 1280. The ISP 1240 may be the ISP 200 illustrated in FIG. 1 and may include the noise removing device 100, 100a, or 100b that use a pattern matching method (described above with reference to FIGS. 2, 12, and 17), according to some embodiments of the present disclosure. The ISP 1240 may be implemented in a chip separated from the image sensor 1300. Alternatively, the ISP 1240 and the image sensor 1300 may be integrated into a single chip.

The display unit 1400 may be any device that can output an image using image data output from the digital image processor 1200. The display unit 1400 may be implemented as a computer, a mobile phone, a smart phone, or any type of image output terminal.

Figure 20:
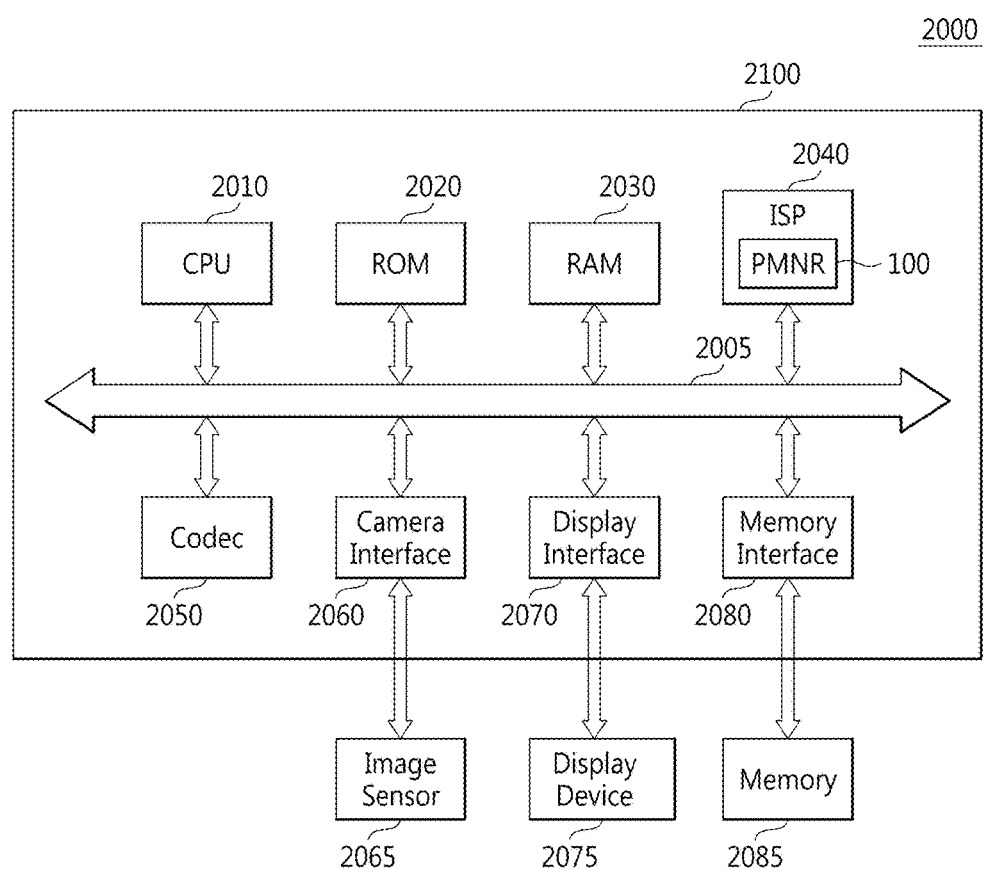
FIG. 20 is a block diagram of an image processing system according to further embodiments of the present disclosure.

FIG. 20 is a block diagram of an image processing system 2000 according to further embodiments of the present disclosure. Referring to FIG. 20, the image processing system 2000 may be implemented as a mobile terminal such as a smart phone, a tablet PC, a PDA, an EDA, a MID, or an e-book. The image processing system 2000 may include an AP 2100, an image sensor 2065, a display device 2075, and a memory 2085.

The AP 2100 may include a CPU 2010, a read-only memory (ROM) 2020, a random access memory (RAM) 2030, an ISP 2040, a codec 2050, a camera interface 2060, a display interface 2070, and a memory interface 2080. The AP 2100 may be implemented as a system on chip (SoC). The elements 2010, 2020, 2030, 2040, 2050, 2060, 2070, and 2080 of the AP 2100 may communicate data with one another through a bus 2005.

The CPU 2010 may control the overall operation of the AP 2100. For instance, the CPU 2010 may process or execute programs and/or data stored in the ROM 2020 and/or the RAM 2030. The CPU 2010 may be a single computing component, i.e., a multi-core processor with two or more independent actual processors (or cores).

The ROM 2020 may store permanent programs and/or data. The ROM 2020 may be implemented as erasable programmable ROM (EPROM) or electrically erasable programmable ROM (EEPROM).

The RAM 2030 may temporarily store programs, data, and/or instructions. The RAM 2030 may be implemented as dynamic RAM (DRAM) or SRAM. The RAM 2030 may temporarily store data input/output through the interfaces 2060, 2070, and 2080 or data generated by the codec 2050 or the CPU 2010.

The ISP 2040 may perform image processing on data received from the RAM 2030, the camera interface 2060, or the memory interface 2080 and may output image data to the RAM 2030, the display interface 2070, or the memory interface 2080. The ISP 2040 may be formed in software, hardware, or a combination thereof. The ISP 2040 may be the ISP 200 illustrated in FIG. 1 and may include the noise removing device 100, 100a, or 100b that use a pattern matching method (described above with reference to FIGS. 2, 12, and 17), according to some embodiments of the present disclosure.

The codec 2050 may encode or decode data received from the image sensor 2065 or data output to the display device 2075. The codec 2050 may include an encoder (not shown) and a decoder (not shown).

The camera interface 2060 may interface data (e.g., pixel data) input from the image sensor 2065 in the outside of the AP 2100. The display interface 2070 may interface data (e.g., image data) output to the display device 2075 in the outside of the AP 2100. The display device 2075 may output image or video data using a LCD or an AMOLED display.

The memory interface 2080 may interface data received from the memory 2085 in the outside of the AP 2100 or data output to the memory 2085. The memory 2085 may be formed of non-volatile memory such as flash memory or resistive memory.

As described above, when a method of removing noise from image data according to some embodiments of the present disclosure is used, a center pixel is processed separately from a neighboring pixel when a target block is compared with each of at least one comparison blocks. In addition, neighboring pixels are separately processed by directions when the target block is compared with the comparison blocks. Accordingly, all noises having different characteristics can be removed from the image data. As a result, the method reduces the complexity of computation and power consumption necessary for noise removal.

While the concepts described herein have been particularly shown and described with reference to exemplary embodiments thereof, it will be understood by those of ordinary skill in the art that various changes in forms and details may be made therein without departing from the spirit and scope of these concepts as defined by the following claims.

What is claimed is:

1. A method of removing noise from image data output from an image sensor, the method comprising:
    comparing a target block in the image data with each of at least one comparison block around the target block in the image data, and calculating a center pixel similarity between a center pixel of the target block and a center pixel of each of the at least one comparison block, and calculating a neighboring pixel similarity between neighboring pixels neighboring the center pixel in the target block and neighboring pixels neighboring the center pixel of each of the at least one comparison block;
    determining whether an impulsive noise exists in the center pixel of the target block based on the center pixel similarity and the neighboring pixel similarity;
    adjusting a weight applied to a value of the center pixel of each of the at least one comparison block based on a result of the determining; and
    performing weighted averaging on the value of the center pixel of each of the at least one comparison block to estimate a value of the center pixel of the target block.

2. The method of claim 1, wherein the center pixel similarity and the neighboring pixel similarity are calculated using a result of performing pattern matching on each of the at least one comparison block.

3. The method of claim 2, wherein the neighboring pixel similarity is calculated using a pattern descriptor and the pattern descriptor comprises position information of pixels of the target block and of pixels of each of the at least one comparison block.

4. The method of claim 1, wherein the weight is adjusted using both the center pixel similarity and the neighboring pixel similarity based on determining that the impulsive noise does not exist in the center pixel of the target block, and is adjusted using only the neighboring pixel similarity based on determining that the impulsive noise exists in the center pixel of the target block.

5. The method of claim 1, wherein the at least one comparison block is set based on a search range around the target block.

6. The method of claim 1, further comprising:
    pre-processing the image data output from the image sensor before calculating the center pixel similarity and the neighboring pixel similarity.

7. The method of claim 1, wherein the determining whether the impulsive noise exists in the center pixel of the target block is performed based on whether a difference between the center pixel similarity and the neighboring pixel similarity is at least a reference value.

8. The method of claim 1, wherein the image data output from the image sensor is data selected from the group consisting of bayer pattern data, RGB image data, YUV image data, and YCbCr image data.

9. A method of operating an image processing system for removing noise from image data received from an image sensor, the method comprising:
    receiving a pattern descriptor;
    comparing a target block in the image data with each of at least one comparison blocks around the target block in the image data using the pattern descriptor, and calculating a center pixel similarity between a center pixel of the target block and a center pixel of each of the at least one comparison block, and calculating a neighboring pixel similarity between neighboring pixels neighboring the center pixel in the target block and neighboring pixels neighboring the center pixel of each of the at least one comparison block;
    adjusting a weight applied to a value of the center pixel of each of the at least one comparison block using only the neighboring pixel similarity among the center pixel similarity and the neighboring pixel similarity based on determining that an impulsive noise exists in the center pixel of the target block based on the center pixel similarity and the neighboring pixel similarity; and
    performing weighted averaging on the value of the center pixel of each of the at least one comparison block to estimate a value of the center pixel of the target block.

10. The method of claim 9,
    wherein the adjusting the weight applied to the value of the center pixel of each of the at least one comparison block comprises determining whether the impulsive noise exists in the center pixel of the target block based on the center pixel similarity and the neighboring pixel similarity; and wherein the weight is adjusted using both the center pixel similarity and the neighboring pixel similarity based on determining that the impulsive noise does not exist in the center pixel of the target block.

11. The method of claim 9, wherein the at least one comparison block is set based on a search range around the target block.

12. The method of claim 9, wherein the pattern descriptor comprises position information of pixels of the target block and of pixels of each of the at least one comparison block.

13. The method of claim 9, wherein the determining whether the impulsive noise exists in the center pixel of the target block is performed based on whether a difference between the center pixel similarity and the neighboring pixel similarity is at least a reference value.

14. A method of processing image data output from an image sensor, comprising:

generating, using pattern matching, a center pixel similarity between a center pixel of a target block and a center pixel of each of at least one comparison block around the target block in the image data, generating, using pattern matching, a neighboring pixel similarity between neighboring pixels neighboring the center pixel in the target block and neighboring pixels neighboring the center pixel of each of the at least one comparison block;

determining whether an impulsive noise exists in the center pixel of the target block based on the center pixel similarity and the neighboring pixel similarity; and performing weighted averaging on a value of the center pixel of each of the at least one comparison block to estimate a value of the center pixel of the target block, wherein a weight used in the weighted averaging varies based on the determining.

15. The method according to claim 14, further comprising:

adjusting the weight applied to the value of the center pixel of each of the at least one comparison block based on a result of the determining.

16. The method of claim 15, wherein the weight is adjusted using both the center pixel similarity and the neighboring pixel similarity based on determining that the impulsive noise does not exist in the center pixel of the target block, and wherein the weight is adjusted using only the neighboring pixel similarity based on determining that the impulsive noise exists in the center pixel of the target block.

17. The method of claim 14, wherein the neighboring pixel similarity is calculated using a pattern descriptor and the pattern descriptor comprises position information of pixels of the target block and of pixels of each of the at least one comparison block.

18. The method of claim 14, wherein the determining whether the impulsive noise exists in the center pixel of the target block is performed based on whether a difference between the center pixel similarity and the neighboring pixel similarity is at least a reference value.

* * * * *